United States Patent
Seki

(10) Patent No.: US 9,807,837 B2
(45) Date of Patent: Oct. 31, 2017

(54) LIGHT-EMITTING APPARATUS, LUMINAIRE, AND METHOD OF ADJUSTING LIGHT-EMITTING APPARATUS

(71) Applicant: Panasonic Intellectual Property Management Co., Ltd., Osaka (JP)

(72) Inventor: Keisuke Seki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/371,583

(22) Filed: Dec. 7, 2016

(65) Prior Publication Data

US 2017/0171931 A1    Jun. 15, 2017

(30) Foreign Application Priority Data

Dec. 10, 2015    (JP) ................. 2015-241626

(51) Int. Cl.
*H05B 33/00* (2006.01)
*H05B 33/08* (2006.01)
(Continued)

(52) U.S. Cl.
CPC ..... *H05B 33/0845* (2013.01); *H05B 33/0827* (2013.01); *H05B 33/0857* (2013.01);
(Continued)

(58) Field of Classification Search
CPC ........... H05B 33/0815; H05B 33/0827; H05B 33/0845; H05B 33/083; H05B 33/089;
(Continued)

(56) References Cited

U.S. PATENT DOCUMENTS

| 2009/0015759 A1 | 1/2009 | Honbo |
| 2012/0146541 A1* | 6/2012 | Szczeszynski ..... H05B 33/0815 |
| | | 315/294 |

(Continued)

FOREIGN PATENT DOCUMENTS

| JP | 2009-009782 | 1/2009 |
| JP | 2009-016280 | 1/2009 |

(Continued)

*Primary Examiner* — Monica C King
(74) *Attorney, Agent, or Firm* — Renner Otto Boisselle & Sklar, LLP

(57) ABSTRACT

A light-emitting apparatus includes: a light source unit to which constant current corresponding to a dimming level is supplied from a constant current supply (dimming LED driver), and which includes a first light-emitting element column and a second light-emitting element column connected in parallel with the first light-emitting element column; a first detector circuit (resistor) which is connected in series to the first light-emitting element column, and detects a magnitude of a current flowing through the first light-emitting element column; a current adjuster circuit which adjusts a relationship of the magnitude of the current flowing through the first light-emitting element column to the constant current, based on the magnitude of the detected current; and a relationship adjuster circuit (variable resistor) which adjusts the dimming level at a changing point where a relationship of the magnitude of the current flowing through the first light-emitting element column to the dimming level changes.

19 Claims, 24 Drawing Sheets

(51) Int. Cl.
*F21Y 115/10* (2016.01)
*F21V 23/00* (2015.01)

(52) U.S. Cl.
CPC ........ *H05B 33/0887* (2013.01); *F21V 23/001* (2013.01); *F21V 23/009* (2013.01); *F21Y 2115/10* (2016.08)

(58) Field of Classification Search
CPC ............ H05B 33/0818; H05B 37/0272; H05B 33/0851; H05B 33/0809; H05B 37/0227; H05B 33/0812; H05B 37/02; H05B 33/0824; H05B 33/08

See application file for complete search history.

(56) References Cited

U.S. PATENT DOCUMENTS

| | | | |
|---|---|---|---|
| 2012/0212143 A1* | 8/2012 | Esaki | H05B 33/089 315/192 |
| 2013/0314064 A1* | 11/2013 | Theiler | G09G 3/3406 323/282 |
| 2014/0210357 A1 | 7/2014 | Yan et al. | |
| 2014/0232277 A1 | 8/2014 | Takahashi et al. | |
| 2014/0361711 A1 | 12/2014 | Takahashi | |
| 2016/0205741 A1 | 7/2016 | Seki et al. | |

FOREIGN PATENT DOCUMENTS

| | | |
|---|---|---|
| JP | 2010-021008 | 1/2010 |
| JP | 2010-282757 | 12/2010 |
| JP | 2014-146595 | 8/2014 |
| JP | 2014-157744 | 8/2014 |
| JP | 2016-129126 | 7/2016 |
| WO | WO 2013/118208 A1 | 8/2013 |

* cited by examiner

LIGHT-EMITTING APPARATUS, LUMINAIRE, AND METHOD OF ADJUSTING LIGHT-EMITTING APPARATUS

CROSS REFERENCE TO RELATED APPLICATION

This application claims the benefit of priority of Japanese Patent Application Number 2015-241626 filed on Dec. 10, 2015, the entire content of which is hereby incorporated by reference.

BACKGROUND

1. Technical Field

The present disclosure relates to a light-emitting apparatus that supplies current to each of light-emitting element columns, a luminaire including the light-emitting apparatus, and a method of adjusting the light-emitting apparatus.

2. Description of the Related Art

Conventionally, luminaires include a luminaire that includes a light source unit having light-emitting element columns (see, for example, Patent Literature (PTL) 1: International Publication No. WO2013/118208). In the light source unit of the luminaire disclosed in PTL 1, a first light-emitting element column in which first light-emitting elements are connected in series and a second light-emitting element column in which second light-emitting elements are connected in series, are connected in parallel. A first light-emitting element and a second light-emitting element have different color temperatures. In the luminaire disclosed in PTL 1, the color temperature of the luminaire as a whole is changed by adjusting the current flowing through each of the light-emitting element columns following dimming.

SUMMARY

However, in the luminaire disclosed in PTL 1, it is not possible to adjust the relationship between the dimming level and the color temperature.

In view of this, the present disclosure provides a light-emitting apparatus which includes light-emitting element columns and is capable of adjusting the relationship between the dimming level and the current flowing through each of the light-emitting element columns, a luminaire including the light-emitting apparatus, and a method of adjusting the light-emitting apparatus.

A light-emitting apparatus according to an aspect of the present disclosure is a light-emitting apparatus to which a constant current corresponding to a dimming level is supplied from a constant current supply, and which includes: a light source unit to which the constant current is supplied, and which includes a first light-emitting element column including one of a single first light-emitting element or a plurality of first light-emitting elements connected in series, and a second light-emitting element column connected in parallel with the first light-emitting element column, and including one of a single second light-emitting element or a plurality of second light-emitting elements connected in series; a first detector circuit which is connected in series to the first light-emitting element column, and detects a magnitude of a current flowing through the first light-emitting element column; a current adjuster circuit which adjusts a relationship of the magnitude of the current flowing through the first light-emitting element column to the constant current, based on the magnitude of the current detected by the first detector circuit; and a relationship adjuster circuit which adjusts the dimming level at a changing point at which a relationship of the magnitude of the current flowing through the first light-emitting element column to the dimming level changes as a result of adjustment by the current adjuster circuit.

Furthermore, a method of adjusting a light-emitting apparatus according to an aspect of the present disclosure is a method of adjusting a light-emitting apparatus including: a light source unit to which a constant current corresponding to a dimming level is supplied, and which includes: a first light-emitting element column including one of a single first light-emitting element or a plurality of first light-emitting elements connected in series; and a second light-emitting element column connected in parallel with the first light-emitting element column, and including one of a single second light-emitting element or a plurality of second light-emitting elements connected in series; a first detector circuit which is connected in series to the first light-emitting element column, and detects a magnitude of a current flowing through the first light-emitting element column; and a current adjuster circuit which adjusts a relationship of the magnitude of the current flowing through the first light-emitting element column to the constant current, based on the magnitude of the current detected by the first detector circuit, the method including adjusting the dimming level at a changing point at which a relationship of the magnitude of the current flowing through the first light-emitting element column to the dimming level changes as a result of adjustment by the current adjuster circuit.

The present disclosure provides a light-emitting apparatus capable of adjusting the relationship between the dimming level and the current flowing through each of the light-emitting element columns, a luminaire including the light-emitting apparatus, and a method of adjusting the light-emitting apparatus.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS (Underlying Knowledge Forming the Basis of the Present Disclosure)

Prior to describing the present disclosure, the underlying knowledge forming the basis of the present disclosure will be described.

In the luminaire disclosed in PTL 1, the color temperature changes in accordance with the dimming level. In the luminaire, the relationship between the dimming level and the color temperature can change due to individual differences in current supply characteristics. Specifically, it is possible to have individual differences in the current supply output current corresponding to the dimming level, and thus, even when the luminaire is caused to light up at a certain dimming level, the color temperature of the luminaire can be different according to the current supply characteristics. As such, when dimming a plurality of the luminaires using one dimmer, for example, there are instances where the color temperatures of the luminaires are not uniform.

It should be noted that although it is technically possible to provide the current supply with a configuration for suppressing individual differences in current supply characteristics, the configuration of the current supply becomes complex and the cost of the current supply will increase.

In view of this, the present disclosure provides a light-emitting apparatus which includes light-emitting element columns and is capable of adjusting the relationship between dimming level and the current flowing through each of the light-emitting element columns, a luminaire including the light-emitting apparatus, and a method of adjusting the light-emitting apparatus.

Hereinafter, exemplary embodiments of the present disclosure will be described in detail using the drawings. It should be noted that each of the subsequently-described exemplary embodiments show a specific example of the present disclosure. Therefore, numerical values, shapes, materials, structural components, the arrangement and connection of the structural components, etc. shown in the following exemplary embodiments are mere examples, and are not intended to limit the scope of the present disclosure. Therefore, among the structural components in the following exemplary embodiments, components not recited in any one of the independent claims which indicate the broadest concepts of the present disclosure are described as arbitrary structural components.

Furthermore, the respective figures are schematic diagrams and are not necessarily precise illustrations. In addition, in the respective diagrams, identical structural components are given the same reference signs.

Embodiment 1

A light-emitting apparatus, a luminaire including the light-emitting apparatus, and a method of adjusting the light-emitting apparatus according to Embodiment 1 will be described.

[1-1. Luminaire Configuration]

First, the configuration of a luminaire according to an embodiment will be described using the drawings.

Figure 1:
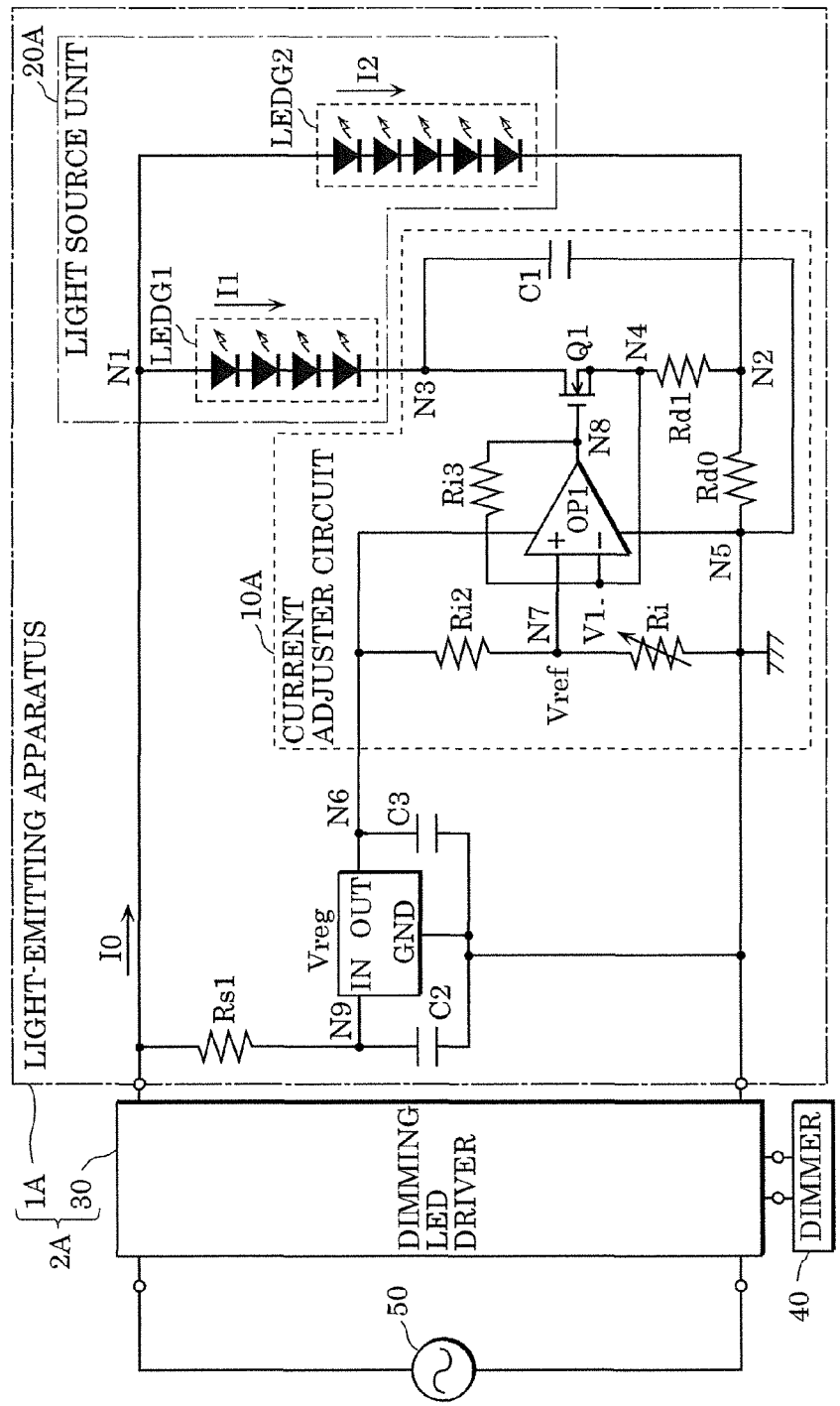
FIG. 1 is a circuit diagram illustrating an example of the circuit configuration of a luminaire according to Embodiment 1.

FIG. 1 is a circuit diagram illustrating an example of the circuit configuration of luminaire 2A according to this embodiment.

Luminaire 2A is a luminaire having a dimming function, and, as illustrated in FIG. 1, includes dimming light-emitting diode (LED) driver 30 and light-emitting apparatus 1A. Luminaire 2A is supplied with alternating current power from alternating current power supply 50. Furthermore, the dimming level of luminaire 2A is determined by dimmer 40.

Alternating current power supply 50 is, for example, a system power supply such as an external commercial power supply.

Dimmer 40 is a device that sets the dimming level of a luminaire. In this embodiment, dimmer 40 outputs, to dimming LED driver 30, a dimming signal indicating the dimming level.

Dimming LED driver 30 is a constant current supply that supplies constant current I0 to light-emitting apparatus 1A. In this embodiment, dimming LED driver 30 supplies, to light-emitting apparatus 1A, constant current I0 corresponding to the dimming signal inputted from dimmer 40. Dimming LED driver 30 has a dimmer circuit for implementing the dimming level corresponding to the dimming signal. A phase dimmer, for example, can be used as a dimmer circuit. The dimmer circuit adjusts the phase (ON phase) range of the alternating current voltage. It should be noted that a pulse width modulation (PWM) dimmer circuit may be used as a dimmer circuit. Furthermore, dimming LED driver 30 further includes (not illustrated) a voltage-raising or voltage-dropping circuit, a rectifier circuit, a smoothing circuit, etc., converts the alternating current voltage outputted from the dimmer circuit into direct current voltage, and supplies, to light source unit 20A, constant current I0 (direct current) of a magnitude corresponding to the direct current voltage resulting from the conversion. Since the details of such a dimming LED driver 30 are well known to a person having ordinary skill in the art, description thereof will be omitted.

[1-1-1. Light-Emitting Apparatus Configuration]

Light-emitting apparatus 1A includes a plurality of light sources (light-emitting element columns) of different color temperature, and is an apparatus that performs color toning of light to be emitted, according to the change in one parameter which is the magnitude of constant current I0 outputted from dimming LED driver 30. In other words, light-emitting apparatus 1A performs color toning according to the dimming level. Light-emitting apparatus 1A is configured to distribute constant current I0 among the light-emitting element columns, and performs color toning by adjusting the brightness of each of the light-emitting element columns by changing the ratio of current that is passed to the respective light-emitting element columns.

As illustrated in FIG. 1, light-emitting apparatus 1A mainly includes light source unit 20A, three-terminal regulator Vreg, a first detector circuit (resistor Rd1), a constant current detector circuit (resistor Rd0), current adjuster circuit 10A, and a relationship adjuster circuit (variable resistor Ri). The respective structural components of lighting apparatus 1A will be described below.

[Light Source Unit]

Light source unit 20A includes first light-emitting element column LEDG1 in which one or more first light-emitting elements are connected in series and second light-emitting element column LEDG2 connected in parallel to first light-emitting element column LEDG1 and in which one or more second light-emitting elements are connected in series. Light source unit 20A is supplied with constant current I0 from dimming LED driver 30 which is a constant current supply.

In this embodiment, first light-emitting element column LEDG 1 is a light-emitting element column (light-emitting module) including four LEDs of the same type which are connected in series. Here, "same type" of LEDs means LEDs having forward voltages of the same magnitude. The four LEDs are examples of first light-emitting elements. The four LEDs included in first light-emitting element column LEDG1 are what are called light bulb color LEDs having a color temperature of 2,700 K. It should be noted that although it is sufficient that the four LEDs included in first light-emitting element column LEDG1 have the same color temperature, using the "same type" of LEDs referred to here makes it possible to reduce cost.

It should be noted that each of the LEDs included in first light-emitting element column LEDG1 may emit light having a color temperature of 2,700 K, or the color of the light emitted by each of the LEDs may be converted by phosphors, etc. into light having a 2,700 K color temperature.

In the subsequent description, the cathode terminal of the leading LED of first light-emitting element column LEDG1 in the direction in which current flows is referred to as the cathode terminal of first light-emitting element column LEDG1, and the anode terminal of the fourth LED in the direction in which current flows is referred to as the anode terminal of first light-emitting element column LEDG1. In first light-emitting element column LEDG1, the anode terminal and the cathode terminal are connected to node N1 and node N3, respectively. Furthermore, the current flowing through first light-emitting element column LEDG1 is referred to as current I1.

In this embodiment, second light-emitting element column LEDG2 is a light-emitting element column (light-emitting module) including five LEDs of the same type which are connected in series. Here, "same type" of LEDs means LEDs having forward voltages of the same magnitude. The five LEDs are examples of second light-emitting elements. The five LEDs included in second light-emitting element column LEDG2 are what are called daylight white color LEDs having a color temperature of 5,000 K. It should be noted that the forward voltages of all the LEDs included in second light-emitting element column LEDG2 are the same, and, here, they are the same as the forward voltages of the LEDs included in first light-emitting element column LEDG1. It should be noted that although it is sufficient that the five LEDs included in second light-emitting element column LEDG2 have the same color temperature, using the "same type" of LEDs referred to here makes it possible to reduce cost.

It should be noted that each of the LEDs included in second light-emitting element column LEDG2 may emit light having a color temperature of 5,000 K, or the color of the light emitted by each of the LEDs may be converted by phosphors, etc. into light having a 5,000 K color temperature.

In the subsequent description, the cathode terminal of the leading LED of second light-emitting element column LEDG2 in the direction in which current flows is referred to as the cathode terminal of second light-emitting element column LEDG2, and the anode terminal of the fifth LED in the direction in which current flows is referred to as the anode terminal of second light-emitting element column LEDG2. In second light-emitting element column LEDG2, the anode terminal and the cathode terminal are connected to node N1 and node N2, respectively. Furthermore, the current flowing through second light-emitting element column LEDG2 is referred to as current I2.

In this embodiment, the number of LEDs of first light-emitting element column LEDG1 is less than the number of LEDs of second light-emitting element column LEDG2. In other words, the sum of the forward voltages of the one or more LEDs belonging to second light-emitting element column LEDG2 is greater than the sum of the forward voltages of the one or more LEDs belonging to first light-emitting element column LEDG1. As such, when the voltage difference between node N1 and node N2 is greater than the sum of the forward voltages of first light-emitting element column LEDG1 and less than the sum of the forward voltages of second light-emitting element column LEDG2, current flows through first light-emitting element column LEDG1 but current does not flow through second light-emitting element column LEDG2. In other words, in this embodiment, dimming to turn ON first light-emitting element column LEDG1 and turn OFF second light-emitting element column LEDG2 becomes possible.

It should be noted that although, in light-emitting apparatus 1A according to this embodiment, light toning is performed by adjusting the brightness of the respective light-emitting element columns by changing the ratio of the current that is passed to the respective light-emitting element columns, the light distribution characteristics of light-emitting apparatus 1A may be changed by adjusting the brightness of the respective light-emitting element columns. Example configurations for changing the light distribution characteristics of light-emitting apparatus 1A will be described using the drawings.

Figure 2:
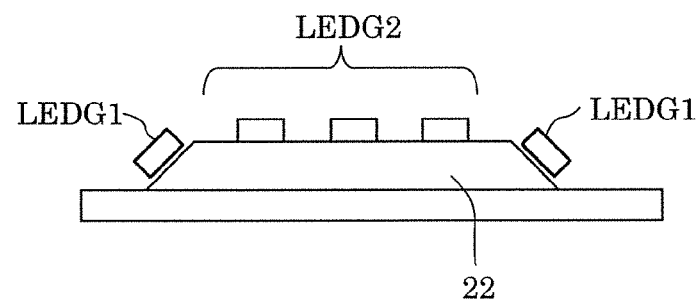
FIG. 2 is a cross-sectional view of an example of the arrangement of a first light-emitting element column and a second light-emitting element column according to Embodiment 1.

FIG. 2 is a cross-sectional view of an example of the arrangement of first light-emitting element column LEDG1 and second light-emitting element column LEDG2 according to this embodiment. First light-emitting element column LEDG1 and second light-emitting element column LEDG2 are arranged on base 22 which is shaped like a circular truncated cone. The four LEDs included in first light-emitting element column LEDG1 are dispersed on the sloped faces of base 22 (two of the LEDs are illustrated in FIG. 2). The five LEDs included in second light-emitting element column LEDG2 are dispersed on the top face of base 22 (three of the LEDs are illustrated in FIG. 2). In this manner, the light distribution characteristics of first light-emitting element column LEDG1 and second light-emitting element column LEDG1 can be made different by adjusting the angles and positions of first light-emitting element column LEDG1 and second light-emitting element column LEDG2.

It should be noted that first light-emitting element column LEDG1 and second light-emitting element column LEDG2 may be mounted on the top face of base 22 illustrated on FIG. 2. Furthermore, although not illustrated in FIG. 2, the first detector circuit, current adjuster circuit 10A, and the relationship adjuster circuit may be mounted on base 22.

[Three-Terminal Regulator]

Three-terminal regulator Vreg is a circuit that generates a constant voltage, and has input terminal IN connected to node N9 and output terminal OUT connected to node N6. Capacitor C2 is connected between input terminal IN and grounding terminal GND. Capacitor C3 is connected between output terminal OUT and grounding terminal GND.

Input terminal IN is connected to the output terminal (node N1) on the high potential side of dimming LED driver 30 via resistor Rs1 Resistor Rs1 inserted between node N1 and input terminal IN is an element for adjusting the voltage applied to input terminal IN to the appropriate magnitude.

[First Detector Circuit]

The first detector circuit is a circuit that is connected in series to first light-emitting element column LEDG1 and detects the magnitude of current I1 flowing through first light-emitting element column LEDG1. In this embodiment, the first detector circuit is resistor Rd1 having one end connected to node N4 and the other end connected to node N2.

Node N4 is a node to which the source terminal of transistor Q1 included in current adjuster circuit 10A, and the minus-side input terminal of operational amplifier (op-amp) OP1 included in current adjuster circuit 10A are connected.

In other words, a voltage obtained by adding a voltage equivalent to the voltage drop in resistor Rd1 to the voltage of node N2 is inputted to the minus-side input terminal of op-amp OP1. Where the resistance of resistor Rd1 is denoted as R1, the voltage equivalent to the voltage drop in resistor Rd1 can be represented as R1×I1, and thus the voltage inputted to the minus-side input terminal of op-amp OP1 is a voltage that is dependent on the magnitude of current I1 flowing through first light-emitting element column LEDG1. By connecting resistor Rd1 in series to first light-emitting element column LEDG1, the magnitude of current I1 can be detected.

[Constant Current Detector Circuit]

The constant current detector circuit is a circuit that detects the magnitude of constant current I0. In this embodiment, the constant current detector circuit is resistor Rd0 having one end connected to node N2 and the other end connected to the low voltage-side terminal (node N5) of dimming LED driver 30.

Where the resistance of resistor Rd0 is denoted as R0, the voltage of node N2 is a voltage obtained by adding a voltage (R0×I0) equivalent to the voltage drop in resistor Rd0 to the voltage of the low voltage-side terminal (node N5) of dimming LED driver 30. In this embodiment, a voltage obtained by adding a voltage equivalent to the voltage drop in resistor Rd0 and a voltage equivalent to the voltage drop in resistor Rd1, which is the first detector circuit, is inputted to the minus-side input terminal of op-amp OP1. By providing resistor Rd0, constant current I0 can be detected.

[Current Adjuster Circuit]

Current adjuster circuit 10A is a circuit that adjusts the relationship of the magnitude of the current flowing through the first light-emitting element column to the magnitude of constant current I0, based on the magnitude of the current detected by the first detector circuit. More specifically, current adjuster circuit 10A compares the magnitude of the current detected by the first detector circuit with a reference value, and thereby changes the relationship of the magnitude of the current flowing through the first light-emitting element column to the magnitude of constant current I0. It should be noted that current adjuster circuit 10A according to this embodiment adjusts the magnitude of the current flowing through first light-emitting element column LEDG1, according to the magnitude of constant current I0 detected by the constant current detector circuit, in addition to the magnitude of the current flowing through first light-emitting element column LEDG1.

As illustrated in FIG. 1, current adjuster circuit 10A includes a voltage divider circuit, transistor Q1, a comparator amplifier circuit, and capacitor C1.

The voltage divider circuit is a circuit that generates reference voltage Vref from a constant voltage outputted from three-terminal regulator Vreg, and outputs a voltage obtained from dividing the constant voltage to the plus-side input terminal of op-amp OP1 illustrated in FIG. 1. The voltage divider circuit is configured of the series circuit of variable resistor Ri and resistor Ri2, and node N7 which is the connection node between variable resistor Ri and resistor Ri2 is the output node. Variable resistor Ri has one end connected to node N5 and the other end connected to node N7. Resistor Ri2 has one end connected to node N6 (node to which output terminal OUT of three-terminal regulator Vreg is connected) and the other end connected to node N7.

Where the resistance of variable resistor Ri is denoted as R11 and the resistance of resistor Ri2 is denoted as R12, reference voltage Vref is a voltage calculated by: (output voltage of three-terminal regulator Vreg)×R11/(R11+R12).

Transistor Q1 is a transistor that adjusts the current flowing through first light-emitting element column LEDG1. Transistor Q1 is a metal-oxide-semiconductor field-effect transistor (MOSFET), and has a gate terminal connected to node N8, a drain terminal connected to the cathode terminal (node N3) of first light-emitting element column LEDG1, and a source terminal connected to the minus-side input terminal of op-amp OP1 and the one end (node N4) of resistor Rd1. In other words, first light-emitting element column LEDG1, the drain terminal and source terminal of transistor Q1, and resistor Rd1, which is the first detector circuit, are connected in series between node N1 and node N2.

The comparator amplifier circuit is a circuit that compares the voltage drops in resistor Rd1 and resistor Rd0 with the reference value, and applies a voltage that is in accordance with the result of the comparison to the control terminal (i.e., gate terminal) of transistor Q1. Here, the comparator amplifier circuit is op-amp OP1 having the plus-side input terminal connected to the output node (node N7) of the voltage divider circuit, the minus-side input terminal connected to node N4 which is the output node of the first detector circuit, and an output terminal connected to the gate terminal (node N8) of transistor Q1. Resistor Ri3 is connected between the minus-side input terminal and the output terminal of op-amp OP1.

Voltage V1−, obtained by adding the voltage drop (R0× I0) in resistor Rd0 and the voltage drop (R1×I1) in resistor Rd1 to the potential of the low voltage-side terminal of dimming LED driver 30, is inputted to the minus-side input terminal of op-amp OP1. Op-amp OP1 compares the voltage drop (R1×I1) in resistor Rd1 and the voltage drop (R0×I0) in resistor Rd0, with reference voltage Vref (i.e., the reference value). When the voltage inputted to the minus-side input terminal of op-amp OP1 is less than reference voltage Vref, op-amp OP1 outputs a high-level (H-level) signal of a magnitude that is in accordance with the difference between the voltage inputted to the minus-side input terminal and reference voltage Vref. Op-amp OP1 outputs a low-level (L-level) signal when the voltage inputted to the minus-side input terminal is greater than reference voltage Vref.

Capacitor C1 is an element for suppressing sudden changes and swings in the current flowing through first light-emitting element column LEDG1. Capacitor C1 is connected between node N3 and node N5.

[Relationship Adjuster Circuit]

The relationship adjuster circuit is a circuit that adjusts the dimming level at the changing point at which the relationship of the magnitude of the current flowing through first light-emitting element column LEDG1 to the dimming level changes as a result of the adjustment by the current adjuster circuit. In this embodiment, the relationship adjuster circuit is variable resistor Ri included in the voltage divider circuit of current adjuster circuit 10A illustrated in FIG. 1. By changing the resistance of variable resistor Ri, reference voltage Vref generated by the voltage divider circuit can be adjusted. Adjusting reference voltage Vref in this manner makes it possible to adjust the dimming level at the changing point at which the relationship of the magnitude of the current flowing through first light-emitting element column LEDG1 to the dimming level changes.

[1-2. Operation]

The operation of current adjuster circuit 10A will be described using the drawings.

Figure 3:
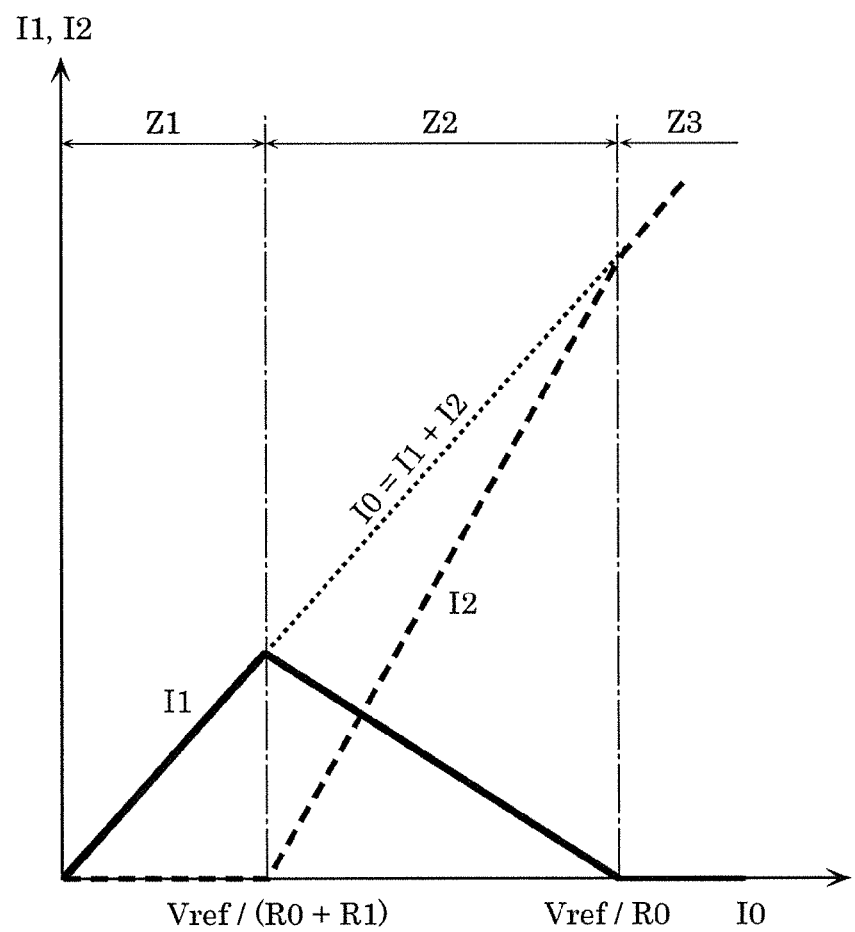
FIG. 3 is a graph illustrating an example of the relationship between currents flowing through the first light-emitting element column and the second light-emitting element column and a constant current according to Embodiment 1.

FIG. 3 is a graph illustrating an example of the relationship between current I1 flowing through first light-emitting element column LEDG1, current I2 flowing through second light-emitting element column LEDG2, and constant current I0, according this embodiment.

In FIG. 3, the horizontal axis represents the magnitude of constant current T0, and the vertical axis represents the magnitude of currents I1 and I2.

In FIG. 3, the graph includes range Z1 in which current I2 is 0, range Z2 in which both current I1 and current I2 are greater than 0, and range Z3 in which current I1 is 0.

(1) Range Z1

Range Z1 is a range in which the magnitude of constant current I0 is less than or equal to a first threshold value. In range Z1, first light-emitting element column LEDG1 is turned ON and second light-emitting element column LEDG2 is turned OFF.

At this time, since the relationship Vref≥(R0+R1)×I0 is satisfied, the first threshold value is represented by Vref/(R0+R1). In range Z1, current adjuster circuit 10A changes the magnitude of current I1 flowing through first light-emitting element column LEDG1 so that current I2 flowing through second light-emitting element column LEDG2 becomes 0.

In range Z1, voltage V1− of the minus-side input terminal of op-amp OP1 is sufficiently less than Vref, and thus the output voltage of op-amp OP1 is fixed at what is called the H-level. With this, transistor Q1 operates in a linear region (i.e., what is called the drain-source resistance becomes extremely small).

Stated differently, range Z1 is a range in which the sum of the forward voltages of second light-emitting element column LEDG2 is greater than the voltage obtained by adding the voltage drop in resistor Rd1 to the sum of the forward voltages of the first light-emitting element column LEDG1, and current I2 of second light-emitting element column LEDG2 is 0.

It should be noted that, as described above, since the first threshold value is represented by Vref/(R0+R1), the first threshold value can be adjusted by the relationship adjuster circuit adjusting Vref.

(2) Range Z2

Range Z2 is a range in which the magnitude of constant current I0 is greater than the first threshold value and less than a second threshold value. It should be noted that the second threshold value is greater than the first threshold value. In range Z2, both first light-emitting element column LEDG1 and second light-emitting element column LEDG2 are turned ON.

At this time, since the relationship $(R0+R1) \times I0 > Vref > R0 \times I0$ is satisfied, the second threshold value is represented by Vref/R0. In range Z2, current adjuster circuit 10A adjusts the magnitude of the current flowing through first light-emitting element column LEDG1 so that current I1 decreases and current I2 increases as constant current I0 increases.

In range Z2, the difference between voltage V1− of the minus-side input terminal and reference voltage Vref of the plus-side input terminal of op-amp OP1 becomes relatively small, and thus the output voltage of op-amp OP1 becomes small. As such, transistor Q1 operates in a saturation region (i.e., operates as what is called a variable resistance element).

Specifically, when reference voltage Vref is greater than voltage V1−, the output voltage of op-amp OP1 increases as the difference between reference voltage Vref and voltage V1− increases. Here, voltage V1− is represented by $R1 \times I1 + R0 \times I0$.

As current I1 decreases, the voltage drops in resistors Rd0 and Rd1 decrease, and the difference between reference voltage Vref and voltage V1− increases. Consequently, the output voltage of op-amp OP1, that is, the voltage of the gate terminal of transistor Q1 increases. When the voltage of the gate terminal of transistor Q1 increases, the resistance of transistor Q1 decreases, and current I1 increases.

As current I1 increases, the voltage drops in resistors Rd0 and Rd1 increase, and the difference between reference voltage Vref and voltage V1− decreases. Consequently, the output voltage of op-amp OP1, that is, the voltage of the gate terminal of transistor Q1 decreases. When the voltage of the gate terminal of transistor Q1 decreases, the resistance of transistor Q1 increases, and current I1 decreases.

In other words, in range Z2, current adjuster circuit 10A adjusts the gate voltage of transistor Q1 so that voltage V1− becomes equal to reference voltage Vref. Stated differently, current adjuster circuit 10A adjusts the gate voltage of transistor Q1 so that current I1 flowing through first light-emitting element column LEDG1 becomes the value shown in Equation 1 below.

$$I1 = (Vref - R0 \times I0)/R1 \quad \text{(Equation 1)}$$

It should be noted that, as described above, since the second threshold value is represented by Vref/R0, the second threshold value can be adjusted by the relationship adjuster circuit adjusting Vref.

(3) Range Z3

Range Z3 is a range in which the magnitude of constant current I0 is greater than or equal to the second threshold value. In range Z3, first light-emitting element column LEDG1 is turned OFF and second light-emitting element column LEDG2 is turned ON.

At this time, since the relationship $R0 \times I0 \geq Vref$ is satisfied, the second threshold value is represented as Vref/R0. In range Z3, current adjuster circuit 10A sets the magnitude of the current flowing through first light-emitting element column LEDG1 to 0.

In range Z3, the voltage drop in resistor Rd0, which is the constant current detector circuit, becomes greater than or equal to reference voltage Vref. At this time, in op-amp OP1, the voltage (reference voltage Vref) of the plus-side input terminal becomes less than voltage V1− of the minus-side input terminal, and thus the output voltage of op-amp OP1 is fixed to the L-level. As such, transistor Q1 is turned OFF, and current I1 of first light-emitting element column LEDG1 becomes 0.

Figure 4:
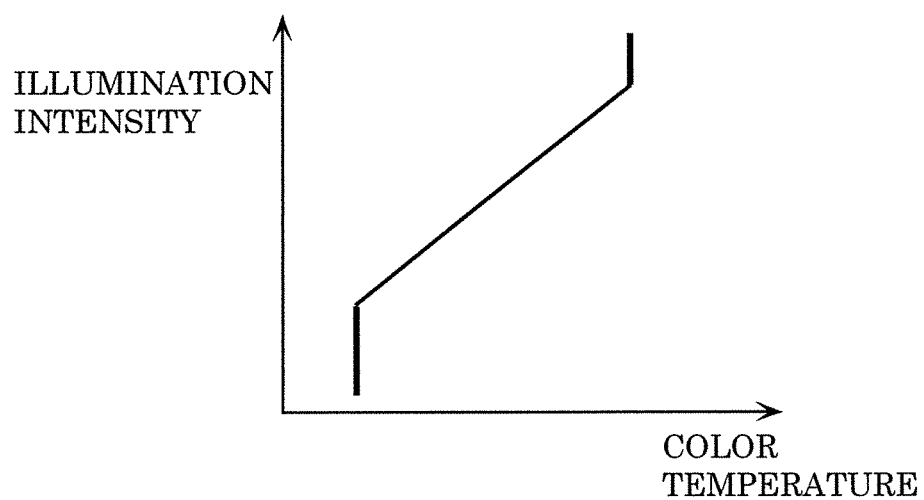
FIG. 4 is a graph illustrating the relationship between color temperature and illumination intensity of a light-emitting apparatus according to Embodiment 1.

FIG. 4 is a graph illustrating the relationship between color temperature and illumination intensity of light-emitting apparatus 1A according to this embodiment.

As illustrated in FIG. 4, in light-emitting apparatus 1A according to this embodiment, while the illumination intensity is low, color temperature is low, and the illumination is of a color approximating red. In light-emitting apparatus 1A, as the illumination intensity increases, the color temperature rises, and illumination of a color approximating a cool color is obtained.

[1-3. Light-Emitting Apparatus Adjustment Method]

An adjustment method using the relationship adjuster circuit of luminaire 2A according to this embodiment will be described.

First, problems that can arise when the adjustment by the relationship adjuster circuit is not performed will be described.

Figure 5:
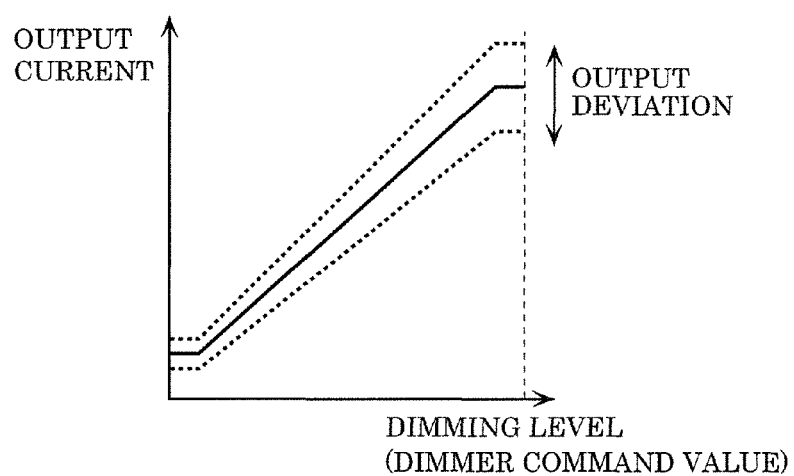
FIG. 5 is a graph illustrating an outline of the relationship between the dimming level and the output current of a dimming LED driver according to Embodiment 1.

FIG. 5 is a graph illustrating an outline of the relationship between the dimming level and the output current of dimming LED driver 30 according to this embodiment.

As indicated by the solid line in the graph in FIG. 5, the output current of dimming LED driver 30 monotonically increases according to an increase in the dimming level. In dimming LED driver 30, individual differences in output characteristics can arise due to the individual difference in the characteristics of elements included in the internal circuits. As such, as indicated by the dotted lines in the graph in FIG. 5, when using a plurality of dimming LED drivers 30, deviation in the relationship between the dimming level and the output current can arise between the plurality of dimming LED drivers 30.

The problem arising in this case will be described using the drawings.

Figure 6:
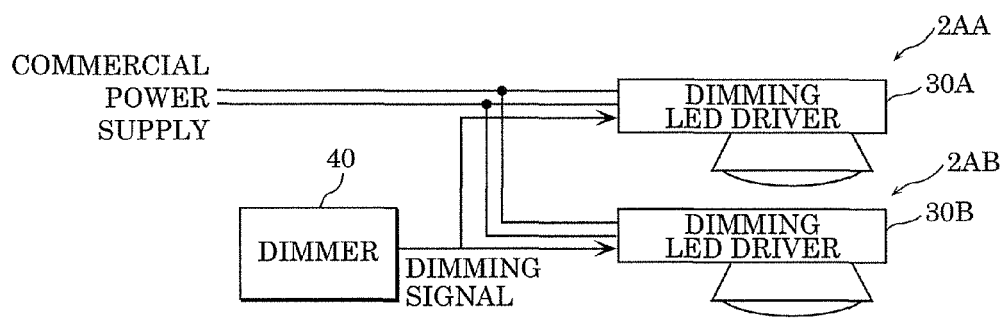
FIG. 6 is an outline circuit diagram illustrating an example of a mode of use of the luminaire according to Embodiment 1.

FIG. 6 is an outline circuit diagram illustrating an example of modes of use of luminaires 2AA and 2AB according to this embodiment.

A case of dimming two luminaires 2AA and 2AB according to this embodiment using one dimmer 40, as illustrated in FIG. 6, will be described. Here, as described above, the output characteristics of dimming LED drivers 30A and 30B included in luminaires 2AA and 2AB, respectively, can be mutually different. The current flowing through the respective light-emitting element columns of luminaires 2AA and 2AB when the output characteristics of dimming LED drivers 30A and 30B are mutually different will be described using the drawings.

Figure 7:
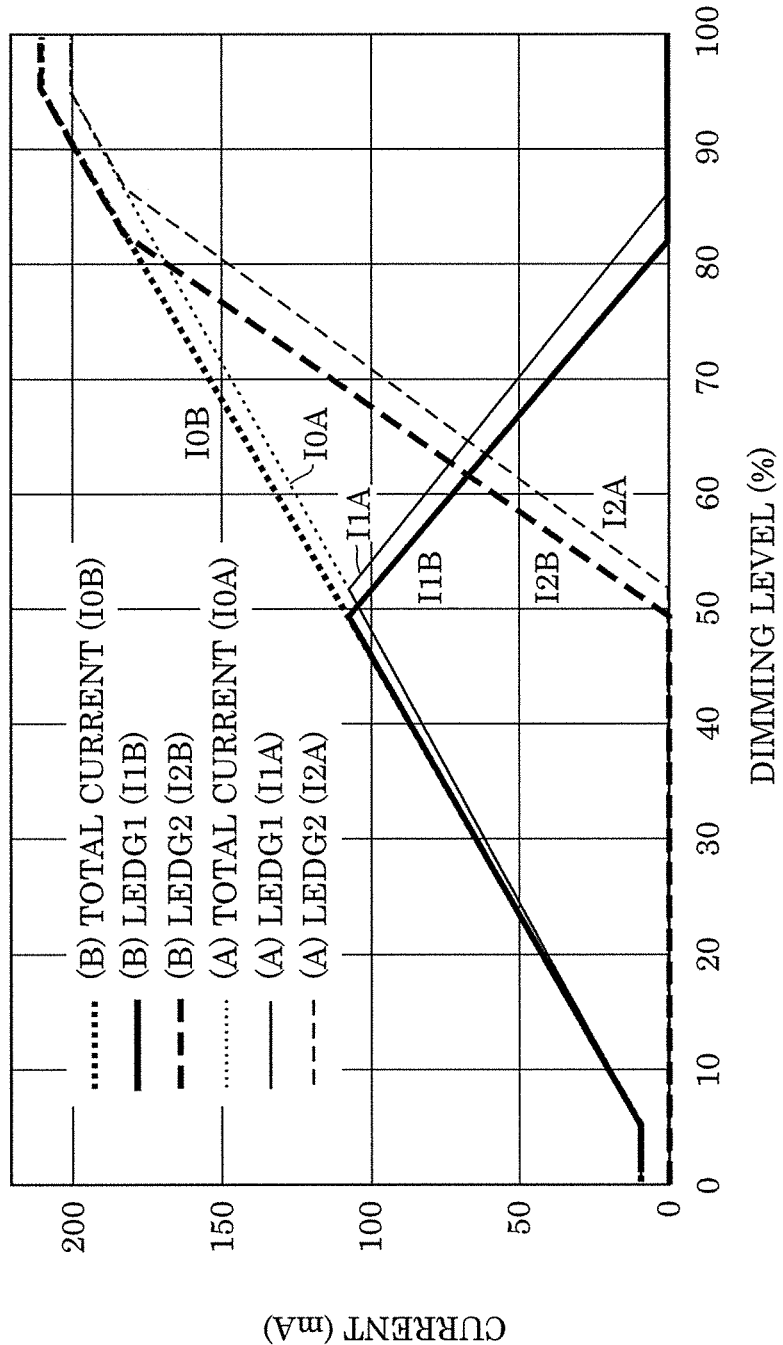
FIG. 7 is a graph illustrating an example of the relationship between the dimming level and the current flowing through each of the light-emitting element columns of each of luminaires and the constant current before adjustment is performed using the relationship adjuster circuit according to Embodiment 1.

FIG. 7 is a graph illustrating an example of the relationship between the dimming level and the current flowing through each of the light-emitting element columns of luminaires 2AA and 2AB and constant current I0 before adjustment is performed using the relationship adjuster circuit according to this embodiment. In FIG. 7, the horizontal axis represents dimming level, and the vertical axis represents current. In FIG. 7, current I1A flowing through first light-emitting element column LEDG1 and current I2A flowing through second light-emitting element column LEDG2 of luminaire 2AA are indicated by a thin solid line and a thin broken line, respectively. Furthermore, constant current I0A of luminaire 2AA is indicated by a thin dotted line. Furthermore, current I1B flowing through first light-emitting element column LEDG1 and current I2B flowing through second light-emitting element column LEDG2 of luminaire 2AB are indicated by a thick solid line and a thick broken line, respectively. Furthermore, constant current I0B of luminaire 2AB is indicated by a thick dotted line.

In the example shown in FIG. 7, in dimming LED driver 30A, constant current I0A corresponding to the dimming level that is 100% is 200 mA, whereas in dimming LED driver 30B, constant current I0B corresponding to the dimming level that is 100% is 210 mA. With this, the currents flowing through the respective light-emitting element columns for the same dimming level are different between luminaire 2AA and luminaire 2AB. For example, as illustrated in FIG. 7, when the dimming level is in a range that is less than or equal to 50%, constant current I0A and current I1A flowing through first light-emitting element column LEDG1 of luminaire 2AA are respectively smaller constant current I0B and current I1B flowing through first light-emitting element column LEDG1 of luminaire 2AB. Accordingly, the changing point at which the relationship of the current flowing through first light-emitting element column LEDG1 to the dimming level changes as a result of the adjustment by current adjuster circuit 10A is different between luminaire 2AA and luminaire 2AB. Here, a changing point in the example illustrated in FIG. 7 is the point at which the rate of change in the magnitude of the current flowing through first light-emitting element column LEDG1 with respect to the dimming level changes. For example, whereas the dimming level at the point at which the rate of change changes from positive to negative, which is one changing point for luminaire 2AA, is approximately 52%, the dimming level at the changing point of luminaire 2AB is approximately 49%. The changing points correspond to the aforementioned first threshold value and the second threshold value.

Here, the ratio of the magnitude of the current flowing through each of the light-emitting element columns to the magnitude of constant current I0 in the example illustrated in FIG. 7 will be described.

Figure 8:
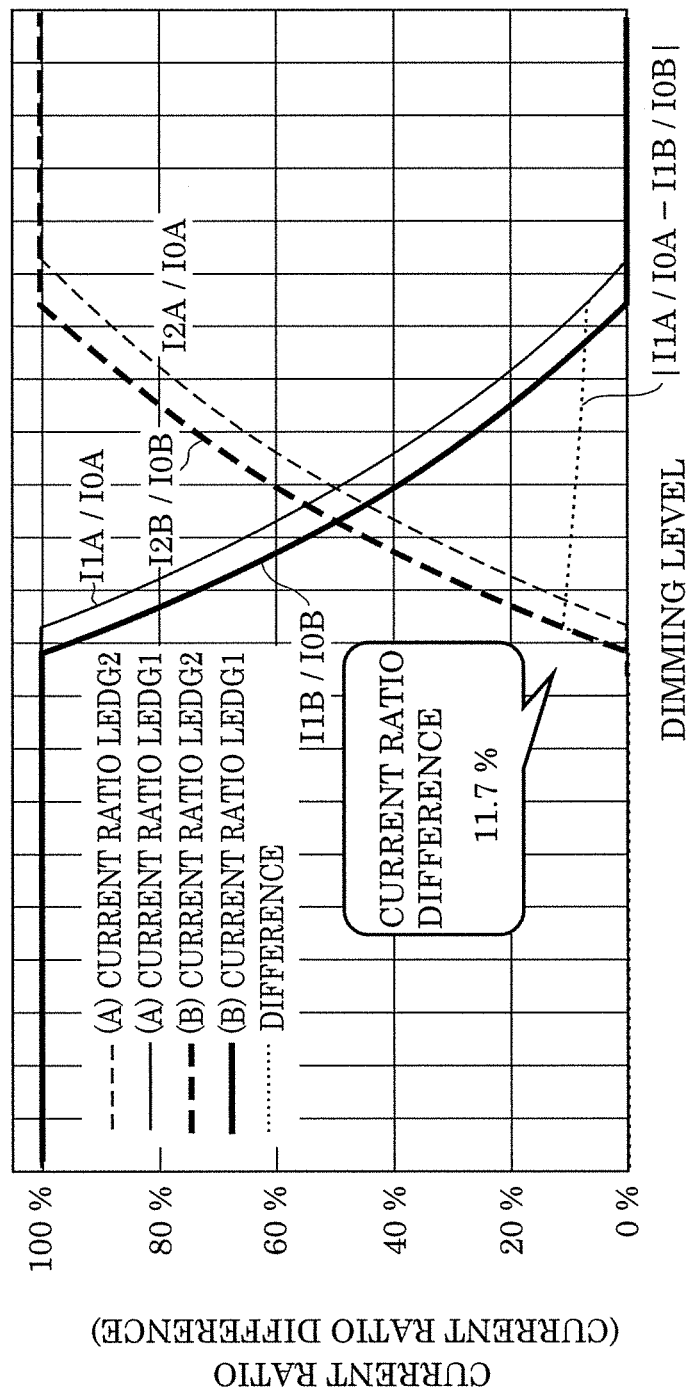
FIG. 8 is a graph illustrating the relationship between the dimming level and the ratio of the magnitude of the current flowing through each of the light-emitting element columns of each of the luminaires to the magnitude of the constant current before adjustment is performed using the relationship adjuster circuit according to Embodiment 1.

FIG. 8 is a graph illustrating the relationship between the dimming level and the ratio of the magnitude of the current flowing through each of the light-emitting element columns of luminaires 2AA and 2AB to the magnitude of the constant current before adjustment is performed using the relationship adjuster circuit according to this embodiment. In FIG. 8, the horizontal axis represents dimming level, and the vertical axis represents ratio. FIG. 8 also illustrates the difference between the ratio of the magnitude of current I1A flowing through first light-emitting element column LEDG1 of luminaire 2AA to the magnitude of constant current I0A and the ratio of the magnitude of current I1B flowing through first light-emitting element column LEDG1 of luminaire 2AB to the magnitude of constant current I0B.

As illustrated in FIG. 8, for example, the relationships between the dimming level and the ratio of the magnitude of the current flowing through first light-emitting element column LEDG1 to the magnitude of the constant current in the respective luminaires are different. In the example illustrated in FIG. 8, the ratios are different by 11.7% between the luminaires. In other words, the ratio between the current flowing through first light-emitting element column LEDG1 having a color temperature of 2,700 K and the current flowing through second light-emitting element column LEDG2 having a color temperature of 5,000 K is different between the luminaires. Therefore, luminaire 2AA and luminaire 2AB emit light of mutually different color temperatures. As such, there are cases where light of the same color temperature cannot be obtained from the two luminaires 2AA and 2AB.

In view of this, light-emitting apparatus 1A according to this embodiment includes the relationship adjuster circuit which adjusts the dimming level at the changing point at which the relationship of the magnitude of the current flowing through first light-emitting element column LEDG1 to the diming level changes. Hereinafter, an adjusting method which uses the relationship adjuster circuit will be described.

As one example, a method of adjusting the dimming level at the changing point at which the relationship of the magnitude of the current flowing through first light-emitting element column LEDG1 to the dimming level changes, in luminaire 2AB in the example illustrated in FIG. 6 through FIG. 8, will be described using the drawings.

Figure 9:
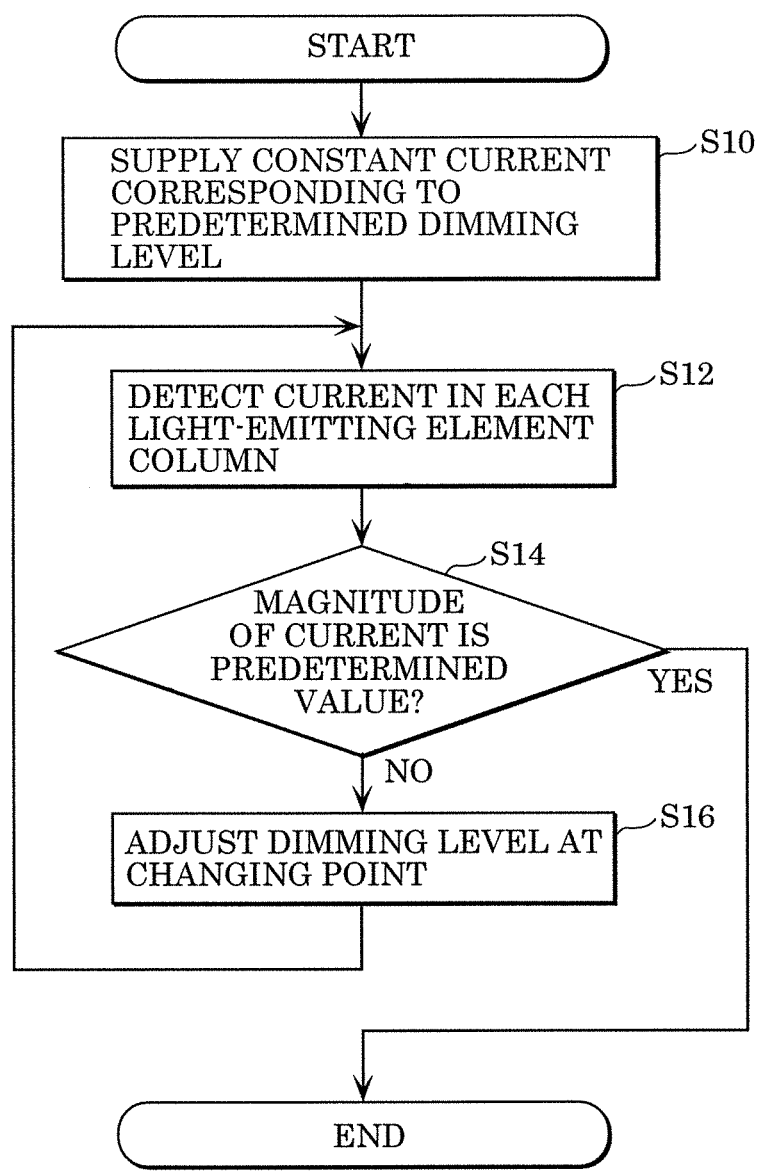
FIG. 9 is a flowchart illustrating a method of adjusting the light-emitting apparatus according to Embodiment 1.

FIG. 9 is a flowchart illustrating a method of adjusting light-emitting apparatus 1A according to this embodiment.

As illustrated in FIG. 9, first, constant current I0 corresponding to the dimming level that has a predetermined value is supplied to light source unit 20A (S10). For example, in luminaire 2AA, the dimming level is set to a level at which the magnitude of the current flowing through light-emitting element column LEDG1 and the magnitude of the current flowing through light-emitting element column LEDG2 become equal. In the example illustrated in FIG. 7 and FIG. 8, dimmer 40 is set to a dimming level of approximately 65% at which the magnitude of the currents flowing through the respective light-emitting element columns of luminaire 2AA become equal.

Next, the magnitudes of the currents flowing through the respective light-emitting element columns are detected (S12). Here, the current detection need not necessarily be performed by directly detecting the current flowing through first light-emitting element column LEDG1 and the current flowing through second light-emitting element column LEDG2. For example, the magnitude of the current flowing through second light-emitting element column LEDG2 may be detected by detecting the magnitude of the current flowing through first light-emitting element column LEDG1 and the magnitude of constant current I0B, and subtracting the magnitude of the current flowing through first light-emitting element column LEDG1 from the magnitude of constant current I0B. Furthermore, the current magnitude itself need not be detected. For example, the voltage drops in resistors Rd0 and Rd1 may be detected.

Next, it is determined whether each of the detected current magnitudes is a predetermined value (S14). For example, it is determined whether the current flowing through first light-emitting element column LEDG1 and the current flowing through second light-emitting element column LEDG2 are equal.

Here, when each of the detected current magnitudes is a predetermined value (YES in S14), it is determined that adjustment is completed (or it is determined that adjustment is unnecessary), and adjustment is ended.

On the other hand, when each of the detected current magnitudes is not a predetermined value (NO in S14), the dimming level at the changing point at which the relationship of the magnitude of the current flowing through first light-emitting element column LEDG1 to the dimming level changes is adjusted (S16).

Specifically, for example, when the dimming level is set to approximately 65%, in luminaire 2AB, the magnitude of the current flowing through first light-emitting element column LEDG1 is smaller the magnitude of the current flowing through second light-emitting element column LEDG2. In this case, in order to increase the magnitude of the current flowing through first light-emitting element column LEDG1, the resistance of variable resistor Ri, which is the relationship adjuster circuit, is increased. Accordingly, since reference voltage Vref can be increased, the dimming level at the changing point can be increased. Consequently, the magnitude of the current flowing through first light-emitting element column LEDG1 when the dimming level is at approximately 65% can be increased.

Next, the process returns once again to step S12 in FIG. 9. In addition, step S12 to step S16 are repeated until it is determined that adjustment is completed.

As described above, by performing adjustment using the relationship adjuster circuit, it is possible to make the dimming levels at the changing points of luminaire 2AA and luminaire 2AB uniform.

Here, the characteristics of luminaire 2AA and luminaire 2AB in the case where the dimming levels at the changing points of luminaire 2AA and luminaire 2AB are made uniform by performing adjustment using the relationship adjuster circuit will be described using the drawings.

Figure 10:
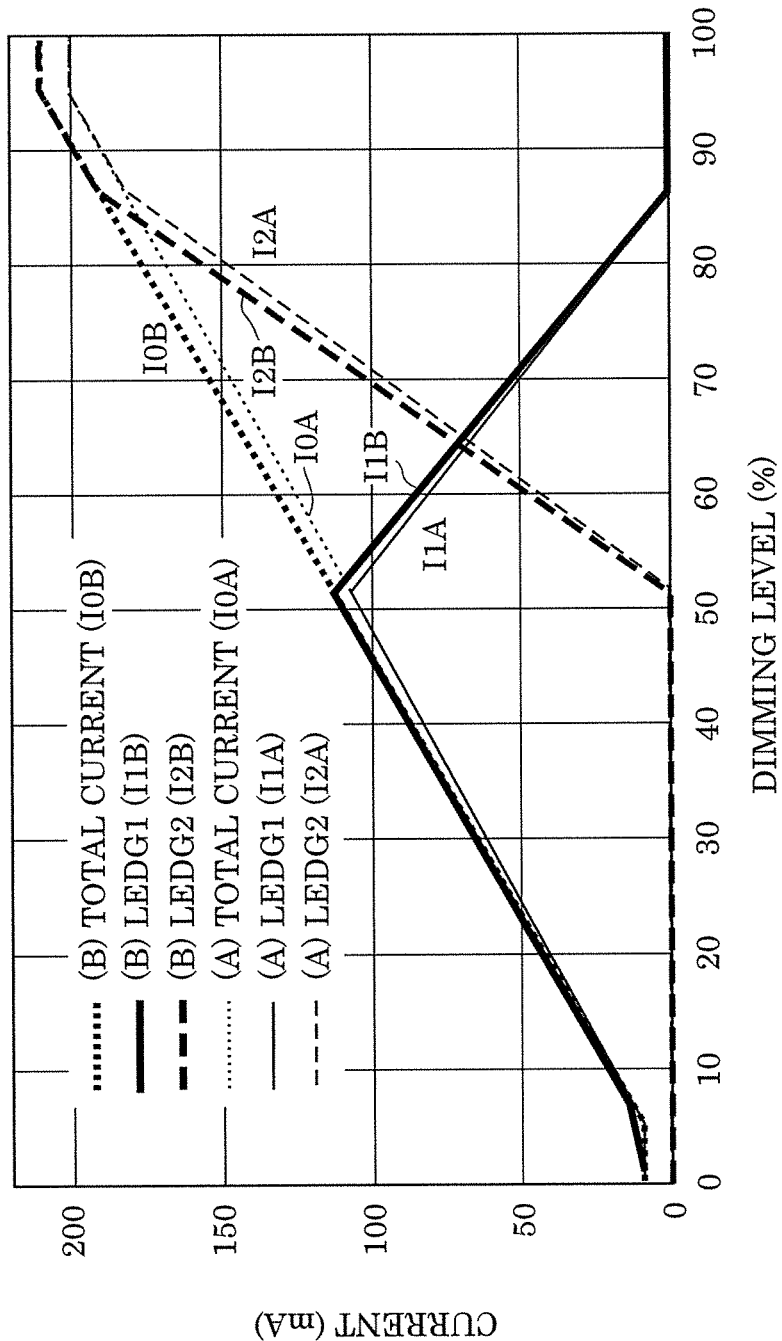
FIG. 10 is a graph illustrating an example of the relationship between the dimming level and the current flowing through each of the light-emitting element columns of each of the luminaires and the constant current after adjustment is performed using the relationship adjuster circuit according to Embodiment 1.

FIG. 10 is a graph illustrating an example of the relationship between the dimming level and the current flowing through each of the light-emitting element columns of luminaires 2AA and 2AB and the constant current after adjustment is performed using the relationship adjuster circuit according to this embodiment. In FIG. 10, the horizontal axis represents dimming level, and the vertical axis represents current.

Figure 11:
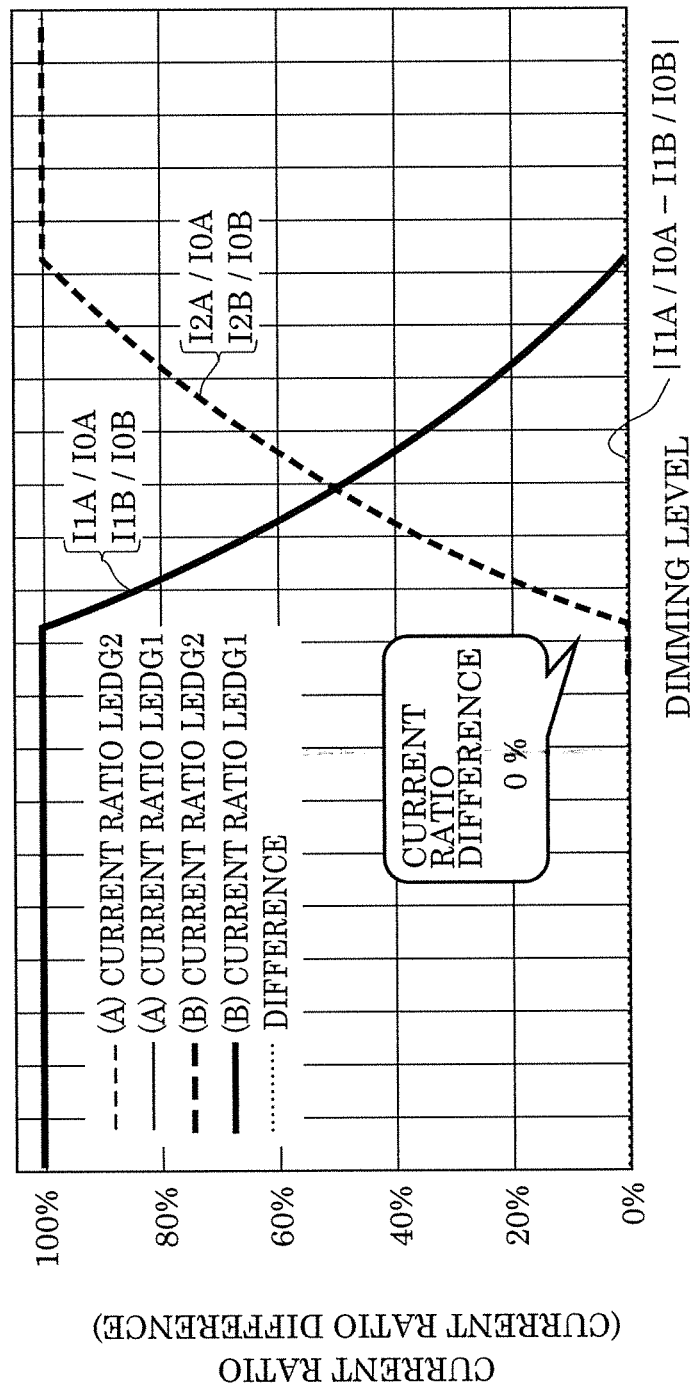
FIG. 11 is a graph illustrating the relationship between the dimming level and the ratio of the magnitude of the current flowing through each of the light-emitting element columns of each of the luminaires to the magnitude of the constant current after adjustment is performed using the relationship adjuster circuit according to Embodiment 1.

FIG. 11 is a graph illustrating the relationship between the dimming level and the ratio of the magnitude of the current flowing through each of the light-emitting element columns of luminaires 2AA and 2AB to the magnitude of the constant current after adjustment is performed using the relationship adjuster circuit according to this embodiment. In FIG. 11, the horizontal axis represents dimming level, and the vertical axis represents ratios. FIG. 11 also illustrates the difference between the ratio of the magnitude of current IA flowing through first light-emitting element column LEDG1 of luminaire 2AA to the magnitude of constant current I0A and the ratio of the magnitude of current IB flowing through first light-emitting element column LEDG1 of luminaire 2AB to the magnitude of constant current I0B.

As illustrated in FIG. 10, the dimming level at the changing point at which the relationship of the magnitude of the current flowing through first light-emitting element column LEDG1 to the dimming level changes has been adjusted to become approximately 52% for luminaires 2AA and 2AB, by adjusting the dimming level at the changing point using the relationship adjuster circuit. Accordingly, as illustrated in FIG. 11, the relationships between the dimming level and the ratio of the magnitude of the current flowing through first light-emitting element column LEDG1 to the magnitude of the constant current in the respective luminaires become substantially equal. Furthermore, the difference between the ratio of the magnitude of current IA flowing through first light-emitting element column LEDG1 of luminaire 2AA to constant current I0A and the magnitude of current IB flowing through second light-emitting element column LEDG2 of luminaire 2AB to constant current I0B also becomes substantially zero at all dimming levels.

As described above, according to luminaire 2A according to this embodiment, it is possible to adjust the dimming level at the changing point using the relationship adjuster circuit. Accordingly, the current characteristics of luminaire 2A with respect to the dimming level can be adjusted to predetermined characteristics. As such, when dimming a plurality of luminaires 2A using one dimmer 40, it is possible to suppress deviation in color temperature, light distribution property, etc. between the plurality of luminaires 2A.

[1-4. Advantageous Effects, etc.]

As described above, light-emitting apparatus 1A according to this embodiment includes light source unit 20A to which constant current I0 is supplied, and which includes first light-emitting element column LEDG1 including one of a single first light-emitting element or a plurality of first light-emitting elements connected in series, and second light-emitting element column LEDG2 connected in parallel to first light-emitting element column LEDG1 and including one of a single second light-emitting element or a plurality of second light-emitting elements connected in series. Furthermore, light-emitting apparatus 1A includes a first detector circuit which is connected in series to first light-emitting element column LEDG1, and detects the magnitude of a current flowing through first light-emitting element column LEDG1. Furthermore, light-emitting apparatus 1A further includes current adjuster circuit 10A which adjusts the relationship of the magnitude of the current flowing through first light-emitting element column LEDG1 to constant current I0, based on the magnitude of the current detected by the first detector circuit. In addition, light-emitting apparatus 1A includes a relationship adjuster circuit which adjusts the dimming level at a changing point at which a relationship of the magnitude of the current flowing through first light-emitting element column LEDG1 to the dimming level changes as a result of adjustment by current adjuster circuit 10A.

Accordingly, the relationship between the dimming level and the currents flowing through the respective light-emitting element columns can be adjusted by adjusting the dimming level at the changing point using the relationship adjuster circuit. As such, it is possible to suppress deviation in the characteristics of light-emitting apparatus 1A caused by individual differences in the characteristics of dimming LED driver 30.

Furthermore, in light-emitting apparatus 1A, the changing point may be a point at which the rate of change in the magnitude of the current flowing through first light-emitting element column LEDG1 with respect to the dimming level changes.

Furthermore, in light-emitting apparatus 1A, the color of light emitted by first light-emitting element column LEDG1 may be different from the color of light emitted by second light-emitting element column LEDG2.

Accordingly, the relationship between the dimming level and the color of light emitted by light-emitting apparatus 1A can be adjusted. Furthermore, when a plurality of luminaires 2A each including light-emitting apparatus 1A and dimming LED driver 30 is to be dimmed using one dimmer 40, the relationship between the dimming level and the color of light emitted for the respective luminaires can be made uniform.

Furthermore, in light-emitting apparatus 1A, the sum of forward voltages of the one of the single second light-emitting element or the plurality of second light-emitting elements included in second light-emitting element column LEDG2 may be greater than the sum of forward voltages of the one of the single first light-emitting element or the plurality of first light-emitting elements included in first light-emitting element column LEDG2.

Furthermore, in light-emitting apparatus 1A, current adjuster circuit 10A may compare the magnitude of the current detected by the first detector circuit to a reference value, and adjust the magnitude of the current flowing through first light-emitting element column LEDG1 to the dimming level, based on the result of the comparison.

Furthermore, in light-emitting apparatus 1A, the first detector circuit may be a resistor connected in series to first light-emitting element column LEDG1. Furthermore, current adjuster circuit 10A may include: transistor Q1 which adjusts the current flowing through first light-emitting element column LEDG1; and a comparator amplifier circuit which compares the voltage drop in the first detector circuit to the reference value, and applies a voltage which is in accordance with the result of the comparison by the comparator, to the control terminal of transistor Q1.

Furthermore, in light-emitting apparatus 1A, the relationship adjuster circuit adjusts the dimming level at the changing point by adjusting the reference value.

Furthermore, in light-emitting apparatus 1A, the relationship adjuster circuit is variable resistor Ri which adjusts the reference value.

Accordingly, the relationship adjuster circuit can be implemented with a simplified configuration. Furthermore, the user can easily perform operations in the adjustment,.

Furthermore, in light-emitting apparatus 1A, first light-emitting element column LEDG1, second light-emitting element column LEDG2, the first detector circuit, current adjuster circuit 10A, and the relationship adjuster circuit are mounted on the same base 22.

Accordingly, light-emitting apparatus 1A can be integrated, and the respective circuits can be electrically connected.

Furthermore, luminaire 2A includes light-emitting apparatus 1A and the constant current supply.

Accordingly, luminaire 2A is capable of producing the same advantageous effects as light-emitting apparatus 1A.

Furthermore, the method of adjusting light-emitting apparatus 1A according to this embodiment includes adjusting the dimming level at a changing point at which the relationship of the magnitude of the current flowing through first light-emitting element column LEDG1 to the dimming level changes as a result of adjustment by current adjuster circuit 10A.

Accordingly, the relationship between the dimming level and the color of light emitted by light-emitting apparatus 1A can be adjusted. Furthermore, when a plurality of luminaires 2A each including light-emitting apparatus 1A and dimming LED driver 30 is to be dimmed using one dimmer 40, the relationship between the dimming level and the color of light emitted for the respective luminaires can be made uniform.

Embodiment 2

A luminaire according to Embodiment 2 will be described.

Whereas dimming LED driver 30 of luminaire 2A receives inputs of dimming signals from dimmer 40 in Embodiment 1, the dimming LED driver of the luminaire according to this embodiment receives inputs of phase-controlled alternating current power from a phase dimmer. Hereinafter, description will be centered on the differences of the luminaire according to this embodiment from luminaire 2A according to Embodiment 1.

[2-1. Configuration]

First, the configuration of the luminaire according to this embodiment will be described using the drawings.

Figure 12:
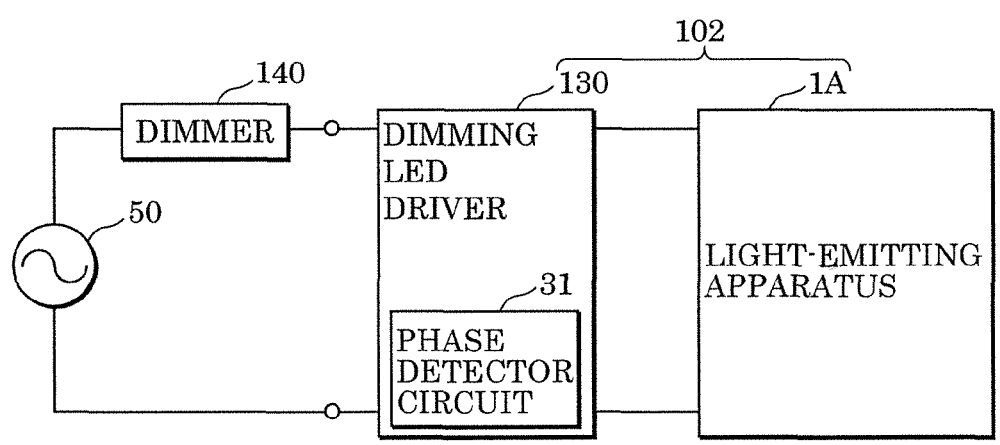
FIG. 12 is a circuit diagram illustrating the outline configuration of a luminaire according to Embodiment 2.

FIG. 12 is a circuit diagram illustrating the outline configuration of luminaire 102 according to this embodiment. FIG. 12 also illustrates, together with luminaire 102, alternating current power supply 50 and dimmer 140.

Dimmer 140 illustrated in FIG. 12 is a phase dimmer which performs dimming by performing alternating current power phase control. Dimmer 140 adjusts the range of the phase (ON phase) of alternating current voltage to be inputted to luminaire 102, according to a control signal from a lighting controller (not illustrated). The lighting controller allows the dimming level to be manipulated in a plurality of stages, and, when operated by a user, outputs a control signal indicating the new dimming level. Dimmer 140 adjusts the aforementioned ON phase range according to the control signal. In other words, the ON phase range corresponds to the dimming level.

As illustrated in FIG. 12, luminaire 102 according to this embodiment includes dimming LED driver 130 and light-emitting apparatus 1A according to Embodiment 1.

Dimming LED driver 130 is a constant current supply that supplies constant current I0 to light-emitting apparatus 1A, in the same manner as dimming LED driver 30 according to Embodiment 1. As illustrated in FIG. 12, dimming LED driver 130 includes phase detector circuit 31. Phase detector circuit 31 is a detector circuit that detects an angle (hereafter also referred to as "ON phase angle") indicating the alternating current voltage ON phase range controlled by dimmer 140. Dimming LED driver 130 adjusts constant current I0 based on the detected angle detected by phase detector circuit 31. In this embodiment, the phase-controlled alternating current voltage is applied to phase detector circuit 31 from dimmer 140. The magnitude of constant current I0 outputted from dimming LED driver 130 increases with the size of the ON phase angle of the alternating current voltage controlled by dimmer 140.

In the same manner as dimming LED driver 30 according to Embodiment 1, individual differences may arise in the output characteristics of dimming LED driver 130 according to this embodiment due to individual differences, etc. in the characteristics of elements included in the internal circuits of dimming LED driver 130. In addition, in dimming LED driver 130, individual differences in output characteristics caused by individual differences in the detected angle of phase detector circuit 31 may also arise. However, by using the relationship adjuster circuit of light-emitting apparatus 1A according to this embodiment, the individual differences in output characteristics caused by the individual differences in the detected angle can also be suppressed.

[2-2. Mode of Use]

A mode of use of a luminaire according to this embodiment will be described using the drawings.

Figure 13:
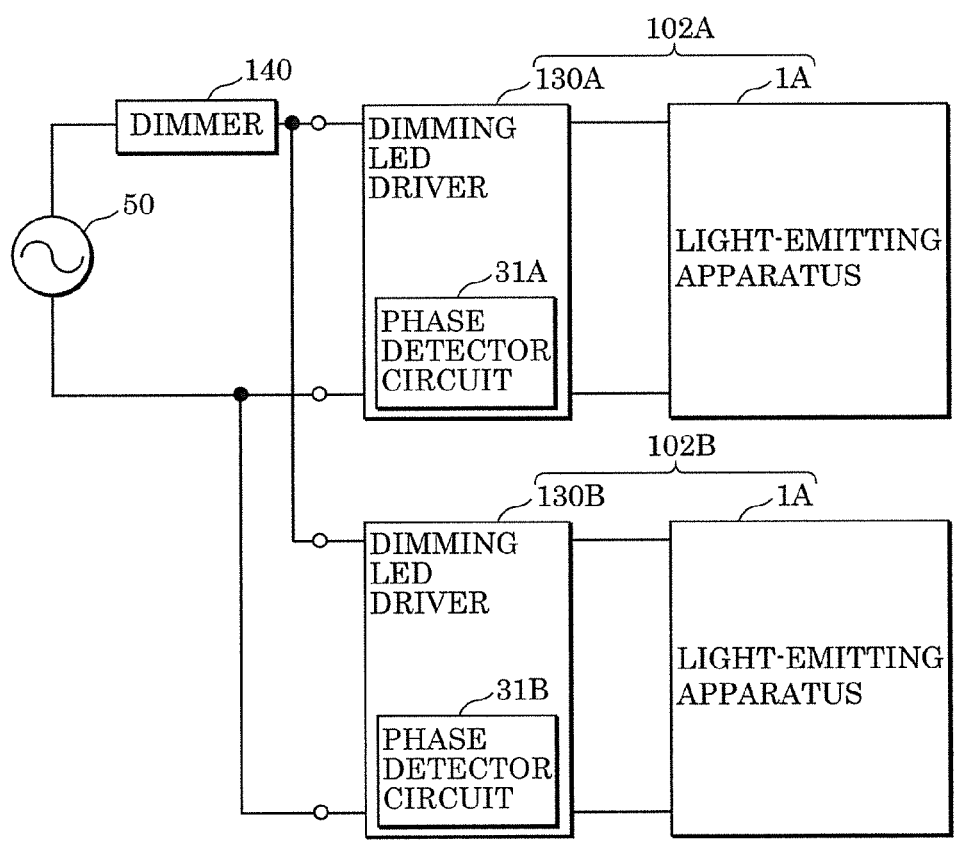
FIG. 13 is an outline circuit diagram illustrating an example of a mode of use of the luminaire according to Embodiment 2.

FIG. 13 is an outline circuit illustrating an example of a mode of use of luminaires 102A and 102B according to this embodiment.

As illustrated in FIG. 13, description will be carried out for a case in which two luminaires 102A and 102B according to this embodiment are dimmed using one dimmer 140. Here, as previously described, the output characteristics of dimming LED drivers 130A and 130B included in luminaires 102A and 102B, respectively, can be mutually different. In this manner, the current flowing through the respective light-emitting element columns of luminaires 102A and 102B when the output characteristics of dimming LED drivers 130A and 130B are mutually different will be described using the drawings.

Figure 14:
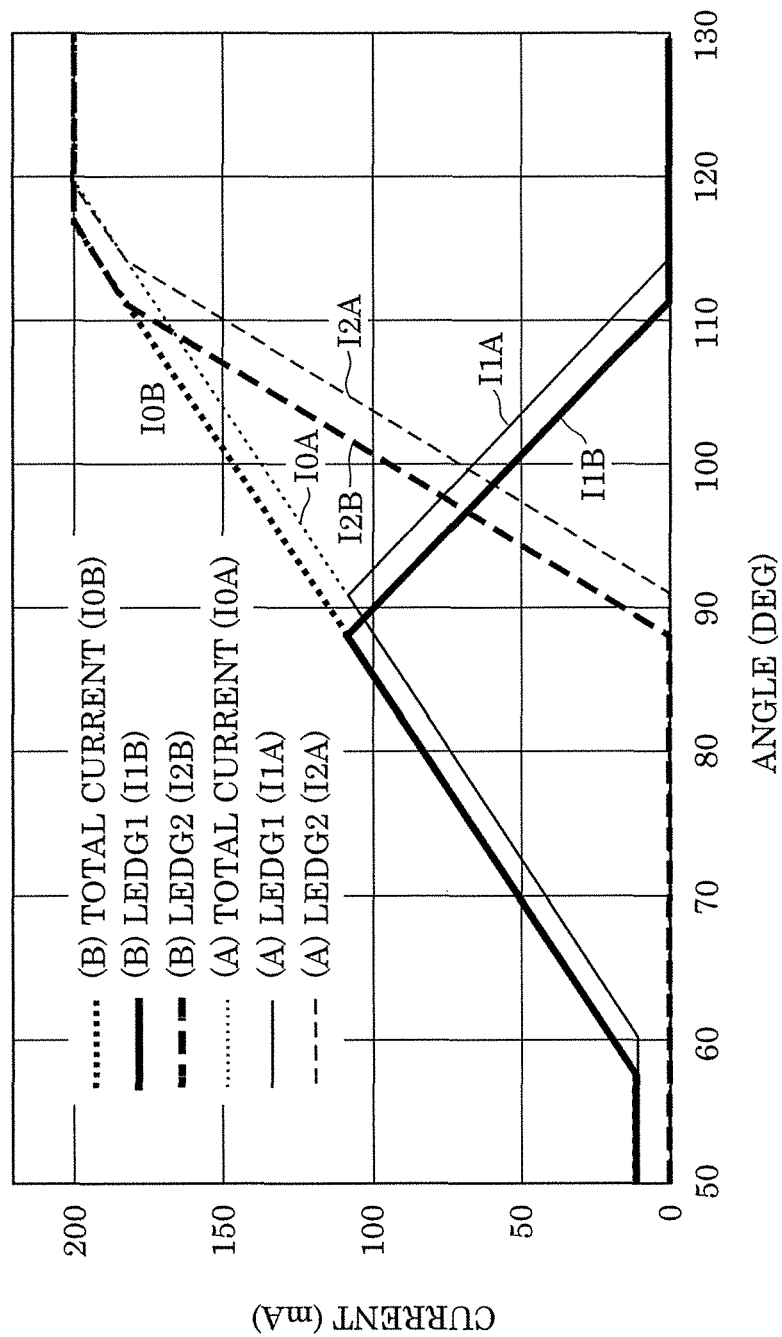
FIG. 14 is a graph illustrating an example of the relationship between the ON phase angle of a dimmer and the current flowing through each of the light-emitting element columns of each of luminaires and the constant current before adjustment is performed using the relationship adjuster circuit according to Embodiment 2.

FIG. 14 is a graph illustrating an example of the relationship between the ON phase angle of dimmer 140 and the current flowing through each of the light-emitting element columns of luminaires 102A and 102B and the constant current before adjustment using the relationship adjuster circuit according to this embodiment is performed. In the graph in FIG. 14, the horizontal axis represents ON phase angle, and the vertical axis represents current. In FIG. 14, current I1A flowing through first light-emitting element column LEDG1 and current I2A flowing through second light-emitting element column LEDG2 of luminaire 102A are indicated by a thin solid line and a thin broken line, respectively. Furthermore, constant current I0A of luminaire 102A is indicated by a thin dotted line. Furthermore, current I1B flowing through first light-emitting element column LEDG1 and current I2B flowing through second light-emitting element column LEDG2 of luminaire 102B are indicated by a thick solid line and a thick broken line, respectively. Furthermore, constant current I0B of luminaire 102B is indicated by a thick dotted line.

In the mode of use illustrated in FIG. 13, substantially the same alternating current power is supplied to luminaires 102A and 102B. However, when there are individual differences in detected angle between phase detector circuits 31A and 31B included in luminaires 102A and 102B, deviation arises in the relationship between the current flowing through each of the light-emitting element columns and the detected angle as illustrated in FIG. 14. In the example illustrated in FIG. 14, the graph indicating the respective currents for luminaire 102B is shifted approximately 3 degrees leftward compared to the graph indicating the respective currents for luminaire 102A. This is caused by the detected angle of phase detector circuit 31B of luminaire 102B deviating approximately 3 degrees compared to the detected angle of phase detector circuit 31A of luminaire 102A. Consequently, in luminaire 102B, the ON phase angle at the changing point at which the relationship of the magnitude of current I1B flowing through first light-emitting element column LEDG1 to the ON phase angle of dimmer 140 changes as a result of the adjustment by current adjuster circuit 10A deviates approximately 3 degrees from the ON phase angle at the changing point of luminaire 102A.

Here, the ratio of the magnitude of the current flowing through each of the light-emitting element columns to the magnitude of constant current in the example illustrated in FIG. 14 will be described.

Figure 15:
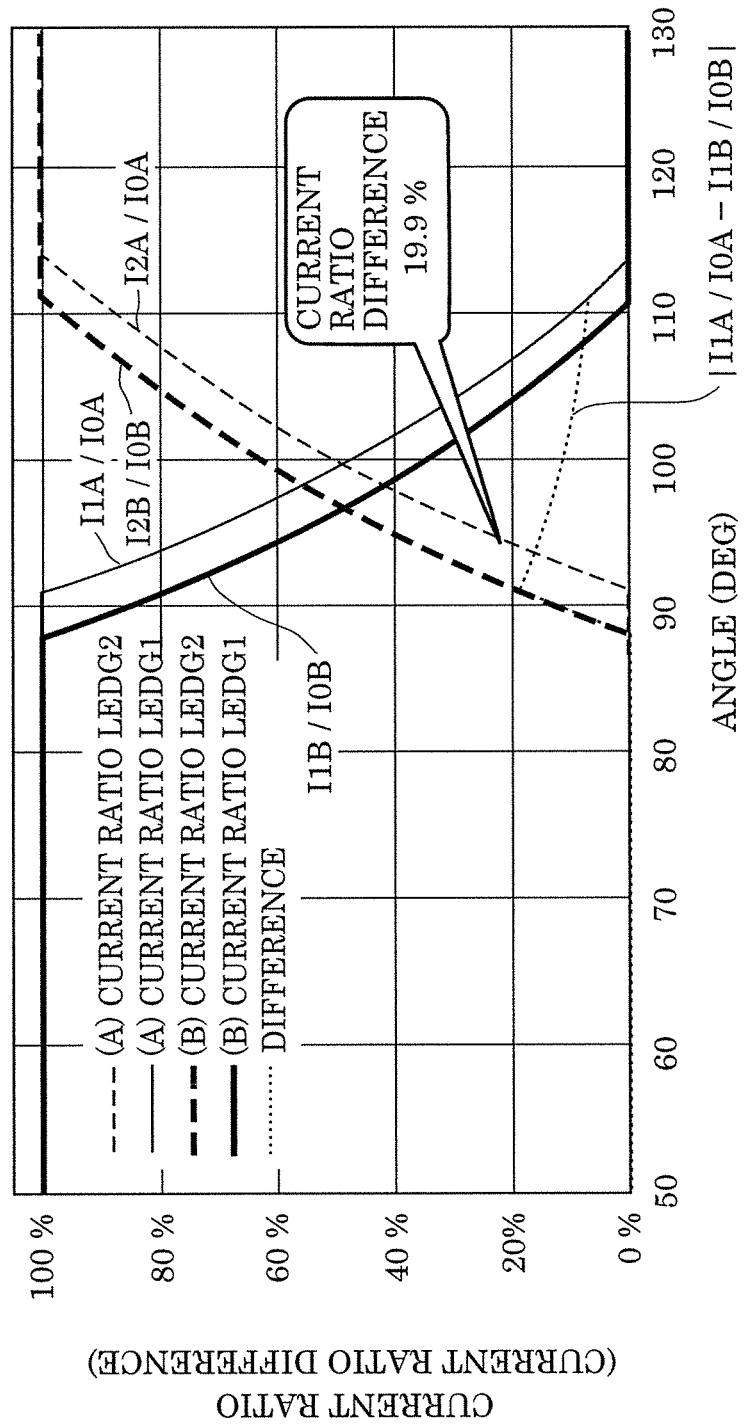
FIG. 15 is a graph illustrating the relationship between the ON phase angle of the dimmer and the ratio of the magnitude of the current flowing through each of the light-emitting element columns of each of the luminaires to the magnitude of the constant current before adjustment is performed using the relationship adjuster circuit according to Embodiment 2.

FIG. 15 is a graph illustrating the relationship between the ON phase angle of dimmer 140 and the ratio of the magnitude of the current flowing through each of the light-emitting element columns of luminaires 102A and 102B to the magnitude of the constant current before adjustment using the relationship adjuster circuit according to this embodiment is performed. In the graph in FIG. 15, the horizontal axis represents ON phase angle, and the vertical axis represents the ratio. FIG. 15 also illustrates the difference between the ratio of the magnitude of current I1A flowing through first light-emitting element column LEDG1 of luminaire 102A to the magnitude of constant current I0A and the ratio of the magnitude of current I1B flowing through first light-emitting element column LEDG1 of luminaire 102B to the magnitude of constant current I0B.

As illustrated in FIG. 15, for example, the relationships between the ON phase angle (that is, the dimming level) and the ratio of the magnitude of the current flowing through first light-emitting element column LEDG1 to the magnitude of the constant current in the respective luminaires are mutually different. In the example illustrated in FIG. 15, the ratios are different by 19.9% between the luminaires. Therefore, even in this embodiment, there are instances where light of the same color temperature cannot be obtained from the two luminaires 102A and 102B when adjustment using the relationship adjuster circuit is not performed.

Here, in this embodiment, the dimming level at the changing point at which the relationship of the magnitude of the current flowing through first light-emitting element column LEDG1 to the ON phase angle (dimming level) changes can also be adjusted using the relationship adjuster circuit of light-emitting apparatus 1A, in the same manner as in Embodiment 1.

The characteristics of luminaire 102A and luminaire 102B in the case where the ON phase angles at the changing points of luminaires 102A and luminaire 102B are made uniform by adjustment using the relationship adjuster circuit will be described using the drawings.

Figure 16:
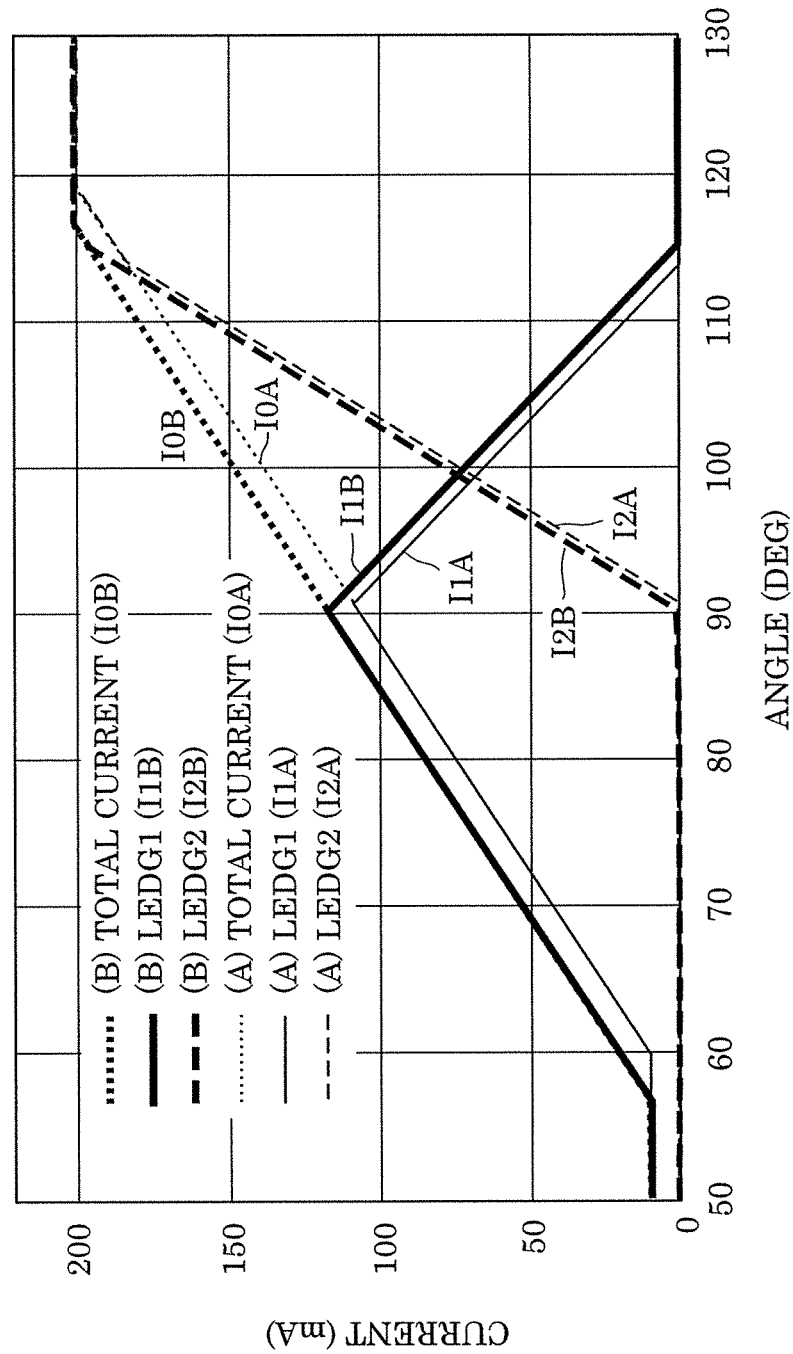
FIG. 16 is a graph illustrating an example of the relationship between the ON phase angle of the dimmer and the current flowing through each of the light-emitting element columns of each of the luminaires and the constant current after adjustment is performed using the relationship adjuster circuit according to Embodiment 2.

FIG. 16 is a graph illustrating an example of the relationship between the ON phase angle of dimmer 140 and the current flowing through each of the light-emitting element columns of luminaires 102A and 102B and the constant current after adjustment using the relationship adjuster circuit according to this embodiment is performed. In the graph in FIG. 16, the horizontal axis represents ON phase angle, and the vertical axis represents current.

Figure 17:
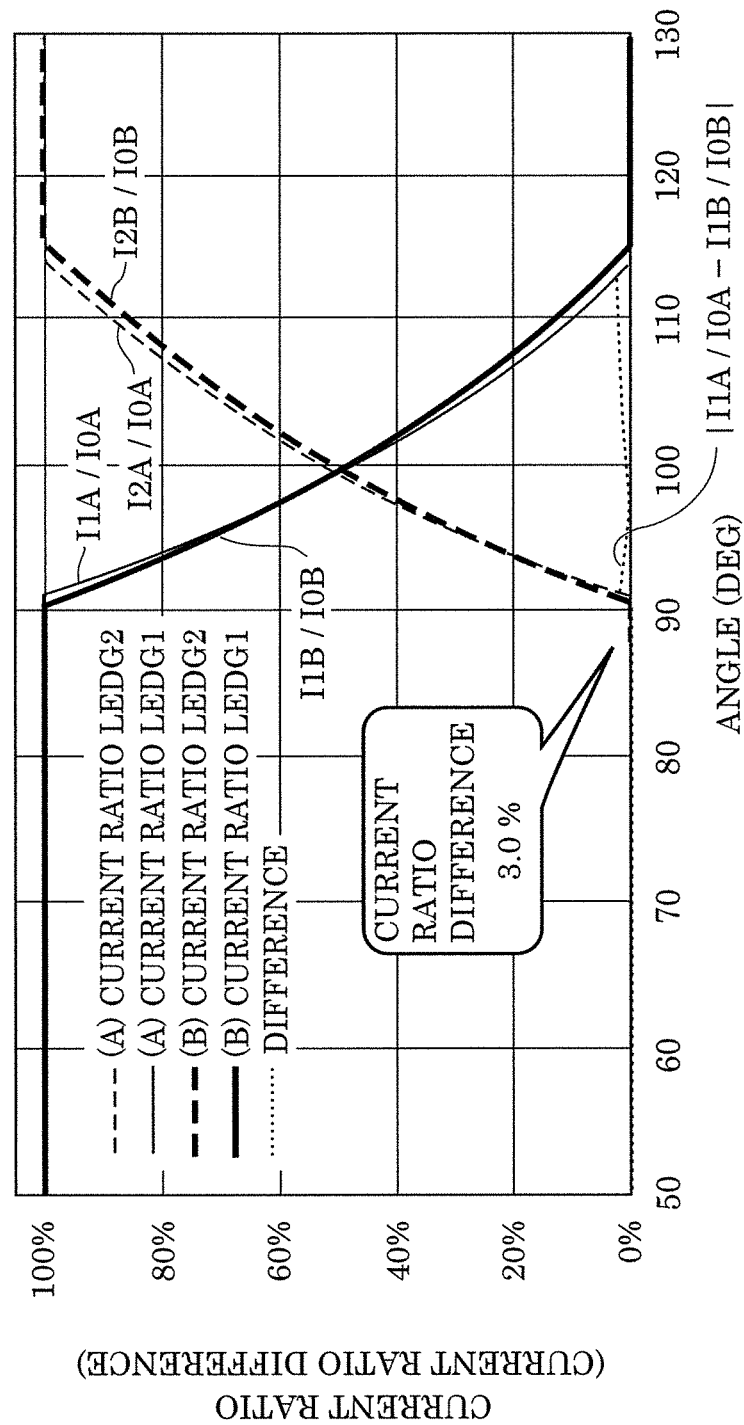
FIG. 17 is a graph illustrating the relationship between the ON phase angle of the dimmer and the ratio of the magnitude of the current flowing through each of the light-emitting element columns of each of the luminaires to the magnitude of the constant current after adjustment is performed using the relationship adjuster circuit according to Embodiment 2.

FIG. 17 is a graph illustrating the relationship between the ON phase angle of dimmer 140 and the ratio of the magnitude of the current flowing through each of the light-emitting element columns of luminaires 102A and 102B to the magnitude of the constant current after adjustment using the relationship adjuster circuit according to this embodiment is performed. In the graph in FIG. 17, the horizontal axis represents ON phase angle, and the vertical axis represents the ratio. FIG. 17 also illustrates the difference between the ratio of the magnitude of current I1A flowing through first light-emitting element column LEDG1 of luminaire 102A to the magnitude of constant current I0A and the ratio of the magnitude of current I1B flowing through first light-emitting element column LEDG1 of luminaire 102B to the magnitude of constant current I0B.

As illustrated in FIG. 16, the ON phase angle at the changing point at which the relationship of the magnitude of the current flowing through first light-emitting element column LEDG1 to the ON phase angle changes has been adjusted to such an angle that the dimming levels of luminaires 102A and 102B both become approximately 51%, by adjusting the ON phase angle at the changing point using the relationship adjuster circuit. Accordingly, as illustrated in FIG. 17, deviation in the relationships between the dimming level and the ratio of the magnitude of the current flowing through first light-emitting element column LEDG1 to the magnitude of the constant current in the respective luminaires is reduced. Furthermore, the difference between the ratio of the magnitude of current I1A flowing through first light-emitting element column LEDG1 of luminaire 102A to constant current I0A and the ratio of the magnitude of current I1B flowing through first light-emitting element column LEDG1 of luminaire 102B to constant current I0B also becomes approximately 3.0% or less.

As described above, luminaire 102 according to this embodiment can also produce the same advantageous effects as luminaire 2A according to Embodiment 1.

[2-3. Advantageous Effect, etc.]

As described above, in luminaire 102 according to this embodiment, the constant current supply is dimming LED driver 30 which supplies alternating current power via a phase dimmer.

Even in this case, individual differences can arise in the detected angle of phase detector circuit 31 of dimming LED driver 30. However, in luminaire 102 according to this embodiment, deviation in the characteristics of light-emitting apparatus 1A caused by the individual differences can be suppressed by adjustment using the relationship adjuster circuit.

Embodiment 3

A light-emitting apparatus, a luminaire including the light-emitting apparatus, and a method of adjusting the light-emitting apparatus according to Embodiment 1 will be described.

In light-emitting apparatus 1A according to Embodiment 1, two detection values, such as the current flowing through first light-emitting element column LEDG1 and the current flowing through second light-emitting element column LEDG2, are required in the adjustment using the relationship adjuster circuit. In this embodiment, a light-emitting apparatus capable of performing the adjustment by detecting only one detection value will be described. Hereinafter, the light-emitting apparatus according to this embodiment will be described centering on the differences from light-emitting apparatus 1A according to Embodiment 1.

[3-1. Luminaire Configuration]

The configuration of the light-emitting apparatus and the luminaire according to Embodiment 3 will be described using the drawings.

Figure 18:
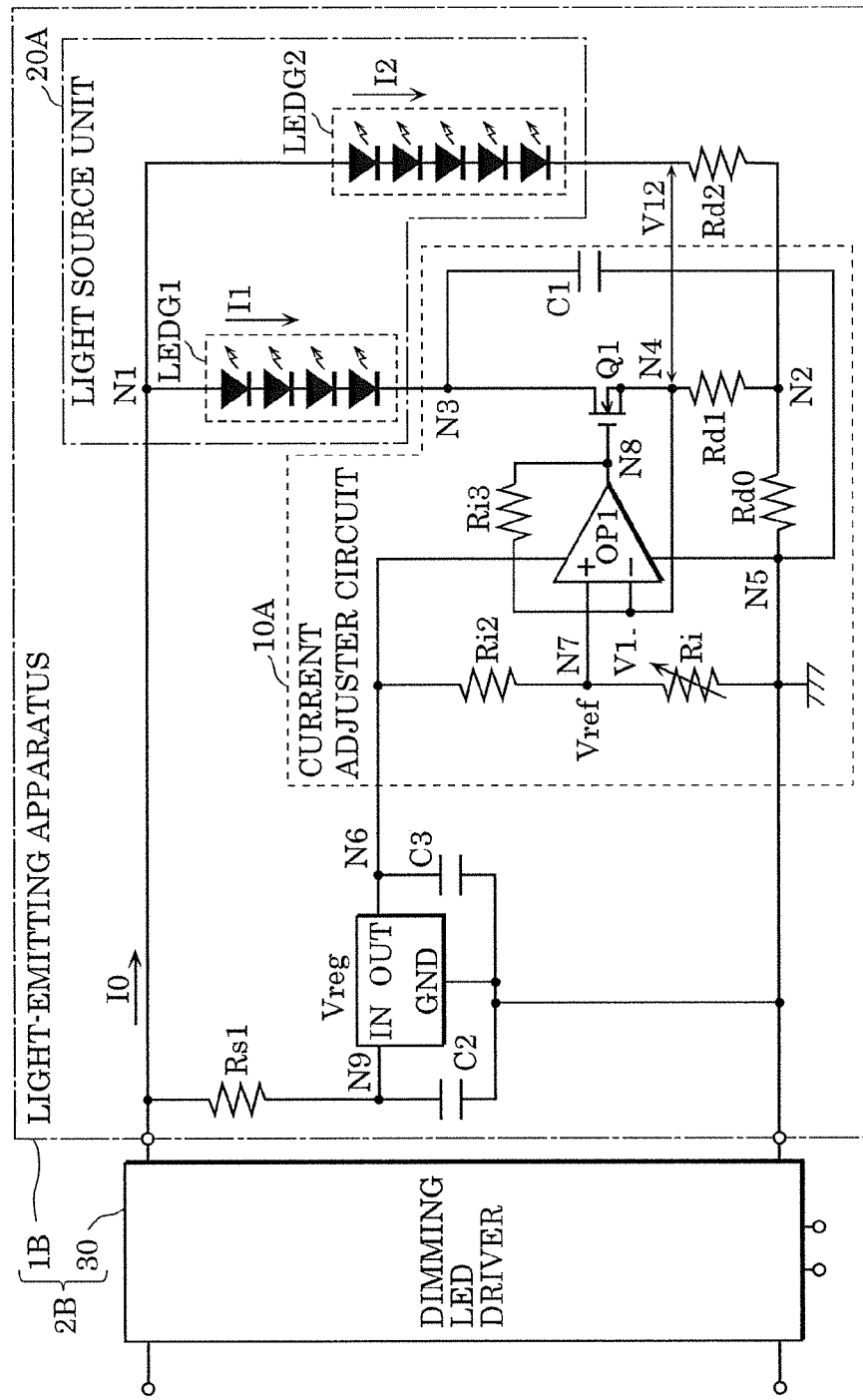
FIG. 18 is a circuit diagram illustrating an example of the circuit configuration of a luminaire according to Embodiment 3.

FIG. 18 is a circuit diagram illustrating an example of the circuit configuration of luminaire 2B according to this embodiment.

As illustrated in FIG. 18, luminaire 2B includes dimming LED driver 30 and light-emitting apparatus 1B.

Light-emitting apparatus 1B differs from light-emitting apparatus 1A according to Embodiment 1 in that resistor Rd2 is connected in series to second light-emitting element column LEDG2, and matches light-emitting apparatus 1A in other points.

Resistor Rd2 is a second detector circuit for detecting the current flowing through second light-emitting element column LEDG2. Resistor Rd2 is used during adjustment using the relationship adjuster circuit of light-emitting apparatus 1B. The method for using resistor Rd2 will be described later.

[3-2. Light-Emitting Apparatus Adjustment Method]

The method of adjusting light-emitting apparatus 1B according to this embodiment will be described using the drawings.

Figure 19:
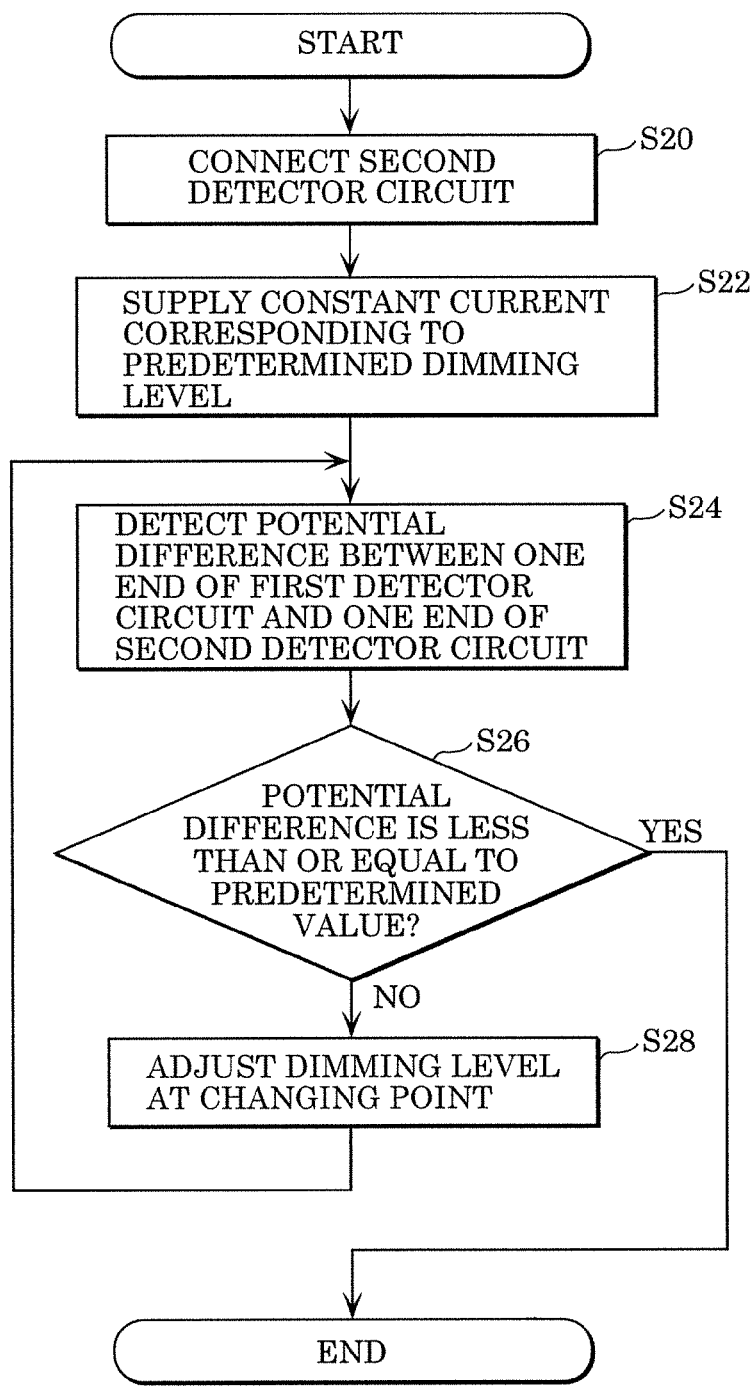
FIG. 19 is a flowchart illustrating a method of adjusting the light-emitting apparatus according to Embodiment 3.

FIG. 19 is a flowchart illustrating the method of adjusting light-emitting apparatus 1B according to this embodiment.

As illustrated in FIG. 19, first, the second detector circuit which detects the current flowing through second light-emitting element column LEDG2 is connected in series to second light-emitting element column LEDG2 (S20). In this embodiment, resistor Rd2, serving as the second detector circuit, is connected between the cathode terminal of second light-emitting element column LEDG2 and node N2. It should be noted that the resistances of resistor Rd1 (first detector circuit) and resistor Rd2 (second resistor circuit) are denoted as RD1 and RD2, respectively.

Next, constant current I0 corresponding to the dimming level that has a predetermined value is supplied to light source unit 20A (S22). In this embodiment, the characteristic of light-emitting apparatus 1B to be targeted for adjustment is established. For example, the relationship between the dimming level and the magnitude of the current flowing through each of the light-emitting element columns is established as the target characteristic. Then, in view of the target characteristic, constant current I0 corresponding to the dimming level at which the ratio of the magnitude of current I1 flowing through first light-emitting element column LEDG1 to the magnitude of current I2 flowing through second light-emitting element column LEDG2 becomes a predetermined value is supplied to light source unit 20A. Here, in view of the aforementioned target characteristic, constant current I0 corresponding to the dimming level for the case where currents I1 and I2 flowing through first light-emitting element column LEDG1 and second light-emitting element column LEDG2, respectively, satisfy I1:I2=RD2:RD1 is supplied to light source unit 20A. It should be noted that, as described above, RD1 and RD2 are the resistances of resistor Rd1 (first detector circuit) and resistor Rd2 (second detector circuit), respectively.

Next, the potential difference between one end of the first detector circuit (resistor Rd1) and one end of the second detector circuit (resistor Rd2) is detected (S24). In this embodiment, potential difference V12 between the respective high potential side ends of the first detector circuit and the second detector circuit is detected.

Next, it is determined whether the detected potential difference V12 is equal to or less than a predetermined value. Specifically, it is determined whether potential difference V12 is a value small enough to be considered as substantially zero. The predetermined value is established based on resistances RD1 and RD2 of resistors Rd1 and Rd2, respectively, the magnitude of the current to be supplied to light source unit 20A, etc. When potential difference V12 becomes zero, the product of resistance RD1 and current I1 and the product of resistance RD2 and current I2 become equal. In other words, I1:I2=RD2:RD1. As such, upon voltage difference V12 becoming zero, it can be confirmed that the target characteristic is obtained.

When voltage difference V12 is equal to or less than a predetermined value (YES in S26), it is determined that adjustment is completed (or it is determined that adjustment is unnecessary), and adjustment is ended.

On the other hand, when voltage difference V12 is not equal to or less than a predetermined value (NO in S26), the dimming level at the changing point at which the relationship of the magnitude of the current flowing through first light-emitting element column LEDG1 to the dimming level changes is adjusted (S28). The adjustment performed here is the same as the adjustment in step S16 of the method of adjusting according to Embodiment 1 illustrated in FIG. 9.

Next, the process returns once again to step S24 in FIG. 19. In addition, step S24 to step S28 are repeated until it is determined that adjustment is completed.

By performing adjustment using the relationship adjuster circuit as described above, the dimming level at the changing point of luminaire 2B can be adjusted to a predetermined value. It should be noted that the second detector circuit may be removed after adjustment completion, and the part where the second detector circuit was inserted may be short-circuited. Accordingly, power consumption by the second detector circuit can be eliminated.

[3-3. Advantageous Effect, etc.]

As described above, compared to light-emitting apparatus 1A, light-emitting apparatus 1B according to this embodiment further includes a second detector circuit which detects the current flowing through second light-emitting element column LEDG2.

Accordingly, the current flowing through second light-emitting element column LEDG2 can be detected.

Furthermore, in the method of adjusting light-emitting apparatus 1B according to this embodiment, second detector circuit which detects the current flowing through second light-emitting element column LEDG2 is connected in series to second light-emitting element column LEDG2, and constant current I0 corresponding to the dimming level that has a predetermined value is supplied to light source unit 20A. In addition, the dimming level at the changing point is adjusted based on the magnitude of the current detected by the first detector circuit and the magnitude of the current detected by the second detector circuit.

Accordingly, the relationship between the dimming level and the current flowing through each of the light-emitting element columns of light-emitting apparatus 1B can be adjusted to a desired relationship.

Furthermore, in the method of adjusting light-emitting apparatus 1B according to this embodiment, the first detector circuit is the first resistor, the second detector circuit is the second resistor, and the dimming level at the changing point is adjusted so that the potential difference between one end of the first detector circuit and one end of the second detector is less than or equal to a predetermined value.

Accordingly, adjustment can be performed while detecting only potential difference V12, without detecting the current flowing through each of the light-emitting element columns. As such, adjustment can be performed easily using only a single voltmeter.

Embodiment 4

A light-emitting apparatus and a luminaire including the light-emitting apparatus according to Embodiment 4 will be described.

Whereas the relationship adjuster circuit is provided in the voltage divider circuit that generates reference voltage Vref in light-emitting apparatus 1A according to Embodiment 1, in this embodiment, the relationship adjuster circuit is provided in the constant current detector circuit. Hereinafter, the light-emitting apparatus according to this embodiment will be described centering on the differences from light-emitting apparatus 1A according to Embodiment 1.

[4-1. Luminaire Configuration]

The configuration of the light-emitting apparatus and the luminaire according to Embodiment 4 will be described using the drawings.

Figure 20:
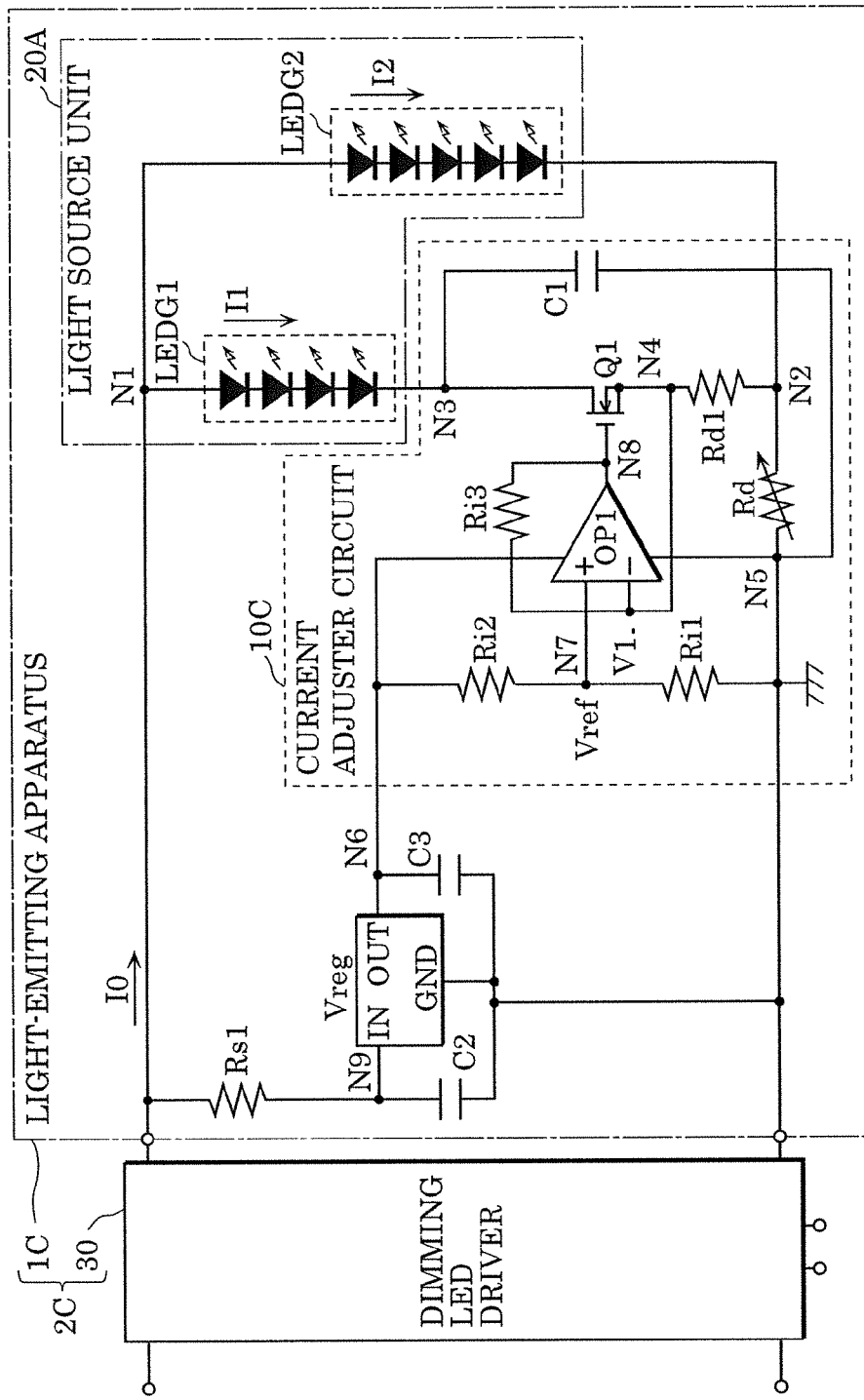
FIG. 20 is a circuit diagram illustrating an example of the circuit configuration of a luminaire according to Embodiment 4.

FIG. 20 is a circuit diagram illustrating an example of the circuit configuration of luminaire 2C according to this embodiment.

As illustrated in FIG. 20, luminaire 2C includes dimming LED driver 30 and light-emitting apparatus 1C.

Light-emitting apparatus 1C mainly includes light source unit 20A, three-terminal regulator Vreg, a first detector circuit (resistor Rd1), a constant current detector circuit (variable resistor Rd), and current adjuster circuit 10C. Light-emitting apparatus 1C is different from light-emitting apparatus 1A according to Embodiment 1 in that variable resistor Rd is used as the constant current detector circuit, and variable resistor Rd is used as the relationship adjuster circuit By changing the resistance of variable resistor Rd, the voltage applied to light source unit 20A changes. Consequently, since the magnitude of the current flowing through each of the light-emitting element columns changes, variable resistor Rd can be used as the relationship adjuster circuit. Furthermore, since the relationship adjustment method is the same as when light-emitting apparatus 1A is used, description thereof will be omitted.

[4-2. Advantageous Effect, etc.]

As described above, in light-emitting apparatus 1C according to this embodiment, the relationship adjuster circuit is variable resistor Rd connected in series to light source unit 20A.

Accordingly, it is possible to produce the same advantageous effects as light-emitting apparatus 1A according to Embodiment 1.

Embodiment 5

A light-emitting apparatus, a luminaire including the light-emitting apparatus, and a method of adjusting the light-emitting apparatus according to Embodiment 5 will be described.

In light-emitting apparatus 1A according to Embodiment 1, the relationship adjuster circuit is the variable resistor Ri, and the adjustment of light-emitting apparatus 1A is performed manually by the user. In contrast, the adjustment of the light-emitting apparatus according to this embodiment is performed automatically by the relationship adjuster circuit. Hereinafter, the light-emitting apparatus according to this embodiment will be described centering on the differences from light-emitting apparatus 1A according to Embodiment 1.

[5-1. Luminaire Configuration]

First, the configuration of the luminaire according to this embodiment will be described using the drawings.

Figure 21:
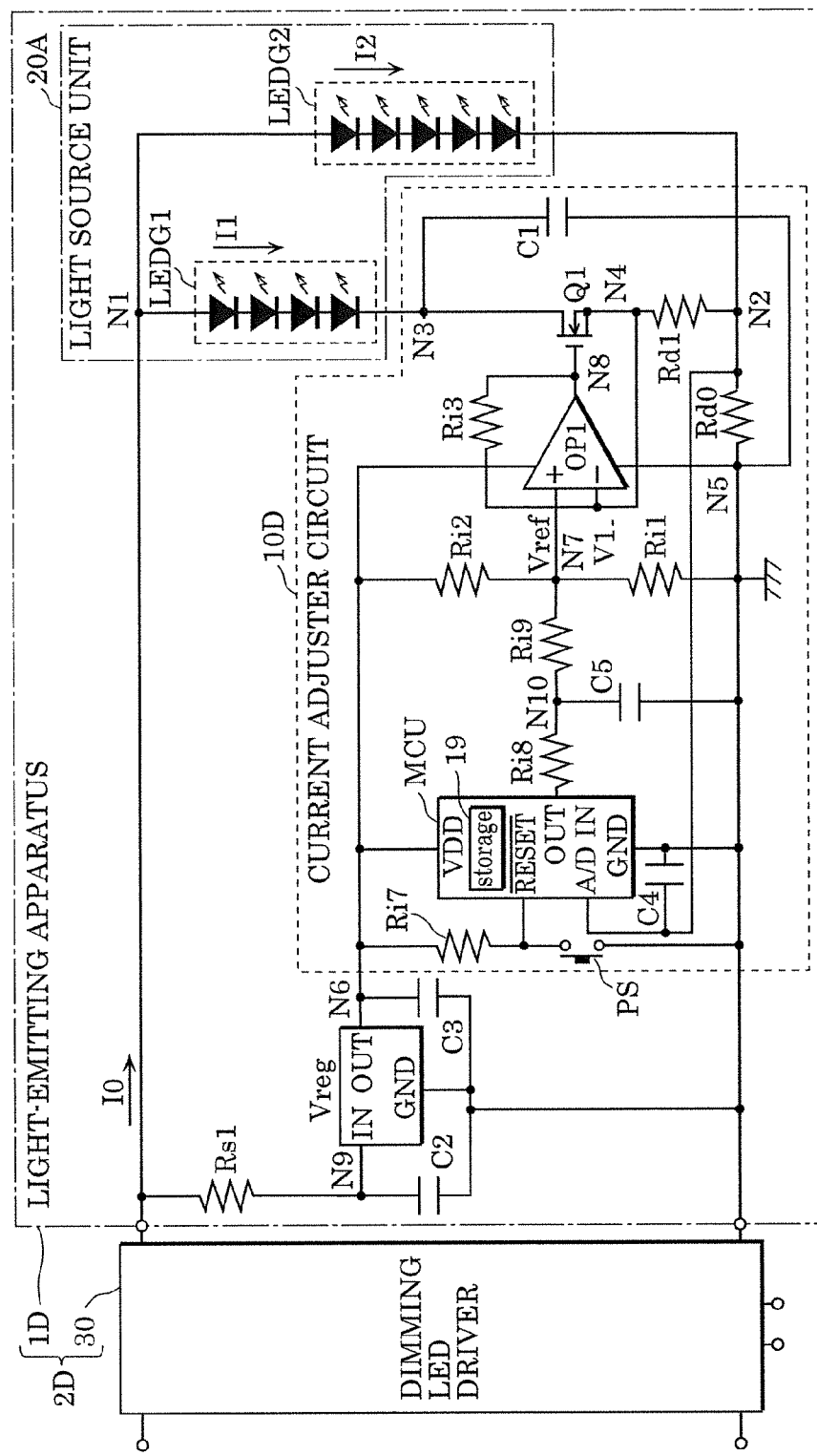
FIG. 21 is a circuit diagram illustrating an example of the circuit configuration of a luminaire according to Embodiment 5.

FIG. 21 is a circuit diagram illustrating an example of the circuit configuration of luminaire 2D according to this embodiment.

As illustrated in FIG. 21, luminaire 2D includes dimming LED driver 30 and light-emitting apparatus 1D.

Light-emitting apparatus 1D mainly includes light source unit 20A, three-terminal regulator Vreg, a first detector circuit (resistor Rd1), a constant current detector circuit (resistor Rd0), current adjuster circuit 10D, and relationship adjuster circuit (microcomputer MCU). Light-emitting apparatus 1D is different from light-emitting apparatus 1A according to Embodiment 1 in that, in current adjuster circuit 10D, reference voltage Vref is adjusted using the relationship adjuster circuit configured of microcomputer MCU.

As illustrated in FIG. 21, current adjuster circuit 10D mainly includes microcomputer MCU, a voltage divider circuit, transistor Q1, a comparator amplifier circuit, and capacitor C1.

The voltage divider circuit is different from the voltage divider circuit according to Embodiment 1 in including resistor Ri1 in place of variable resistor Ri.

The comparator amplifier circuit and capacitor C1 have the same configuration as in Embodiment 1.

Microcomputer MCU is a circuit that adjusts the dimming level at the changing point at which the relationship of the magnitude of the current flowing through first light-emitting element column LEDG1 to the dimming level changes, based on the magnitude of constant current I0 corresponding to the dimming level that has a predetermined value. Specifically, microcomputer MCU outputs a correction signal for adjusting reference voltage Vref from output terminal OUT, based on the magnitude of constant current I0 corresponding to the dimming level that has a predetermined value. Accordingly, the dimming level at the changing point can be adjusted in the same manner as light-emitting apparatus 1A according to Embodiment 1. Microcomputer MCU internally includes a processor, etc. which performs mathematical operations (not illustrated). Details of the operation of microcomputer MCU will be described later.

Microcomputer MCU includes storage 19 in which a value corresponding to the magnitude of constant current I0 corresponding to the dimming level that has a predetermined value is stored. In this embodiment, storage 19 stores a correction value corresponding to the aforementioned correction signal. Storage 19 is configured of a memory, etc.

Microcomputer MCU includes voltage input terminal VDD, reset terminal RESET, output terminal OUT, signal input terminal A/D IN, and grounding terminal GND.

Voltage input terminal VDD is a terminal for applying direct current voltage to microcomputer MCU.

Reset terminal RESET is a terminal for inputting a reset signal to microcomputer MCU.

Output terminal OUT is a terminal for outputting a signal of a predetermined voltage from microcomputer MCU.

Signal input terminal A/D IN is a terminal for receiving inputs of an analog signal to microcomputer MCU. The analog signal inputted to microcomputer MCU from signal input terminal A/D IN is converted into a digital signal in microcomputer MCU.

Grounding terminal GND is a terminal for receiving inputs of ground potential.

Furthermore, current adjuster circuit 10D includes, around microcomputer MCU, resistors Ri7, Ri8, and Ri9, capacitors C4 and C5, and push switch PS.

Resistor Ri7 is an element for adjusting the voltage to be applied to reset terminal RESET of microcomputer MCU to an appropriate magnitude. Resistor Ri7 is connected between node N6 and reset terminal RESET of microcomputer MCU.

Resistors Ri8 and Ri9 are resistors for dividing the voltage outputted from output terminal OUT of microcomputer MCU. Resistor Ri8 is connected between output terminal OUT of microcomputer MCU and node N10. Resistor Ri9 is connected between node N10 and node N7.

Capacitor C4 is a capacitor for smoothing the voltage inputted to signal input terminal A/D IN of microcomputer MCU, and is connected between signal input terminal A/D IN of microcomputer MCU and grounding terminal GND.

Capacitor C5 is a capacitor for smoothing reference voltage Vref of op-amp OP1, and is connected between node N10 and node N5.

Push switch PS is a switch for inputting a signal to reset terminal RESET of microcomputer MCU. Push switch PS is connected between reset terminal RESET of microcomputer MCU and node N5.

[5-2. Light-Emitting Apparatus Adjustment Method]

The method of adjusting light-emitting apparatus 1D according to this embodiment will be described using the drawings.

Figure 22:
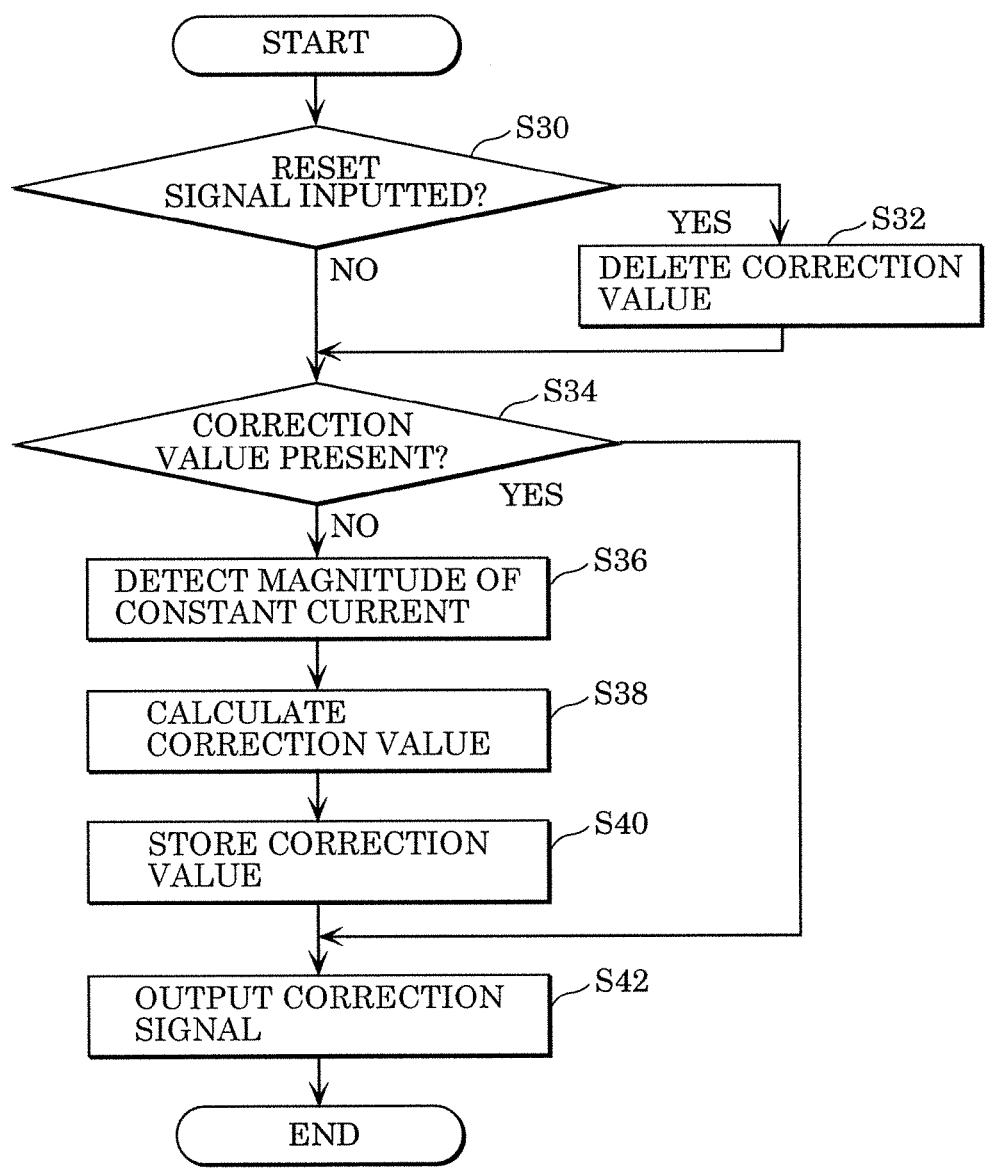
FIG. 22 is a flowchart illustrating a method of adjusting the light-emitting apparatus according to Embodiment 5.

FIG. 22 is a flowchart illustrating the method of adjusting light-emitting apparatus 1D according to this embodiment.

As illustrated in FIG. 22, first, microcomputer MCU determines whether a reset signal has been inputted from reset terminal RESET (S30).

When microcomputer MCU determines that a reset signal has not been inputted (NO in S30), microcomputer MCU determines whether there is a correction value stored in storage 19 (S34).

When microcomputer MCU determines that a reset signal has been inputted (YES in S30), microcomputer MCU deletes the correction value which is a value corresponding to the magnitude of constant current I0 stored in storage 19 (S32), and subsequently determines whether there is a correction value stored in storage 19 (S34). Here, a reset signal is inputted by a user pressing push switch PS. When the user presses push switch PS, the dimming signal to be inputted to dimming LED driver 30 is set to a signal corresponding to a predetermined dimming signal. For the predetermined dimming level, for example, a dimming level of 100% can be adopted.

When microcomputer MCU judges that there is no correction value (NO in S34), microcomputer MCU detects the magnitude of constant current I0 inputted from signal input terminal A/D IN (S36). Because constant current I0 inputted here has a magnitude corresponding to the dimming level as described above, information about the characteristics of dimming LED driver 30 can be obtained from the detected magnitude of constant current I0. Next, microcomputer MCU calculates the correction value corresponding to dimming LED driver 30 (S38), based on the detected magnitude of constant current I0, and stores this calculated correction value in storage 19 (S40). Then, microcomputer MCU outputs a correction signal corresponding to this correction value from output terminal OUT (S42).

On the other hand, when microcomputer MCU determines that there is a correction value in step S34 (YES in S34), microcomputer MCU outputs the correction signal corresponding to the correction value from output terminal OUT (S42). Accordingly, reference voltage Vref is adjusted to an appropriate value, and the relationship between the dimming level and the current flowing through each of the light-emitting element columns of light-emitting apparatus 1D can be adjusted to a predetermined relationship.

[5-3. Advantageous Effect, etc.]

As described above, in light-emitting apparatus 1D according to this embodiment, relationship adjuster circuit adjusts the dimming level at the changing point based on the magnitude of constant current I0 corresponding to the dimming level that has a predetermined value.

Accordingly, for example, at a dimming level of 100% at the time of adjustment, it is possible to output constant current I0 from dimming LED driver 30, and adjust the dimming level at the changing point based on constant current I0.

Furthermore, in light-emitting apparatus 1D according to this embodiment, the relationship adjuster circuit includes storage 19 which stores a value corresponding to the magnitude of constant current I0 corresponding to the dimming level that has a predetermined value.

Accordingly, since the magnitude of constant current I0 when adjustment has been performed can be stored, the appropriate reference voltage Vref can be inputted to op-amp OP1 without performing adjustment again.

As described above, in the method of adjusting light-emitting apparatus 1D according to this embodiment, the dimming level at the changing point is adjusted based on the magnitude of constant current I0 corresponding to the dimming level that has a predetermined value.

Accordingly, for example, at a dimming level of 100% at the time of adjustment, it is possible to output constant current I0 from dimming LED driver 30, and adjust the dimming level at the changing point based on constant current I0.

Embodiment 6

A light-emitting apparatus and a luminaire including the light-emitting apparatus according to Embodiment 6 will be described.

Although an example in which reference voltage Vref is not dependent on constant current I0 is described in Embodiment 1, an example in which reference voltage Vref is changed according to constant current I0 will be described in this embodiment. Hereinafter, a luminaire according to this embodiment will be described centering on the differences from luminaire 2A according to Embodiment 1.

[6-1. Luminaire Configuration]

First, the configuration of the luminaire according to this embodiment will be described using the drawings.

Figure 23:
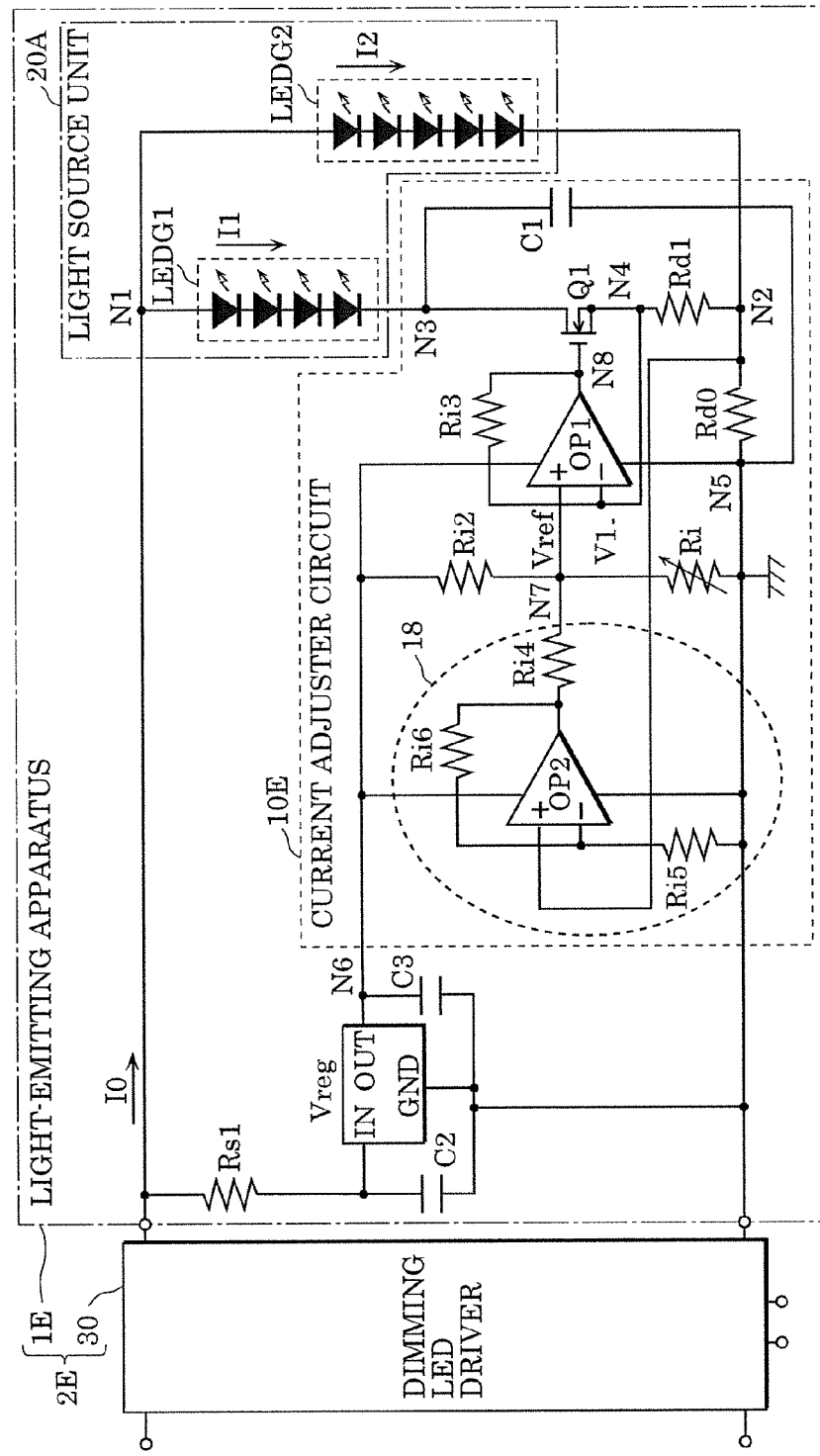
FIG. 23 is a circuit diagram illustrating an example of the circuit configuration of a luminaire according to Embodiment 6.

FIG. 23 is a circuit diagram illustrating an example of the circuit configuration of luminaire 2E according to this embodiment.

As illustrated in FIG. 23, luminaire 2E includes dimming LED driver 30 and light-emitting apparatus 1E.

Light-emitting apparatus 1E mainly includes light source unit 20A, three-terminal regulator Vreg, a first detector circuit (resistor Rd1), a constant current detector circuit (resistor Rd0), current adjuster circuit 10E, and a relationship adjuster circuit (variable resistor Ri).

Current adjuster circuit 10E illustrated in FIG. 23 is different from current adjuster circuit 10A according to Embodiment 1 in terms of the portion surrounded by broken line ellipse 18.

Current adjuster circuit 10E has a configuration in which op-amp OP2 and resistors Ri4 to Ri6 are added to current adjuster circuit 10A in Embodiment 1.

Op-amp OP2 is an example of a reference value adjuster circuit, and amplifies a voltage corresponding to constant current I0 detected by resistor Rd0, and applies the voltage to the plus-side input terminal of op-amp OP1 via resistor Ri4. Op-amp OP2 has a plus-side input terminal connected to node N2, a minus-side input terminal connected to one end of resistor Ri5 and one end of resistor Ri6, and an output terminal connected to one end of resistor Ri4.

Resistor Ri4 has the one end connected to the output terminal of op-amp OP2, and the other end connected to the plus-side input terminal of op-amp OP1. Resistor Ri5 has the one end connected to the minus-side input terminal of op-amp OP2, and the other end connected to the grounding terminal (node N5) of dimming LED driver 30. Resistor Ri6 has the one end connected to the output terminal of op-amp OP2, and the other end connected to the output terminal of op-amp OP2.

It should be noted that although this embodiment describes the case where op-amp OP2 is included in order to change reference voltage Vref according to constant current I0, the present disclosure is not limited to such a configuration. Instead of op-amp OP2, another circuit having non-linear characteristics such as saturation characteristics, etc. may be provided.

[6-2. Operation]

Figure 24:
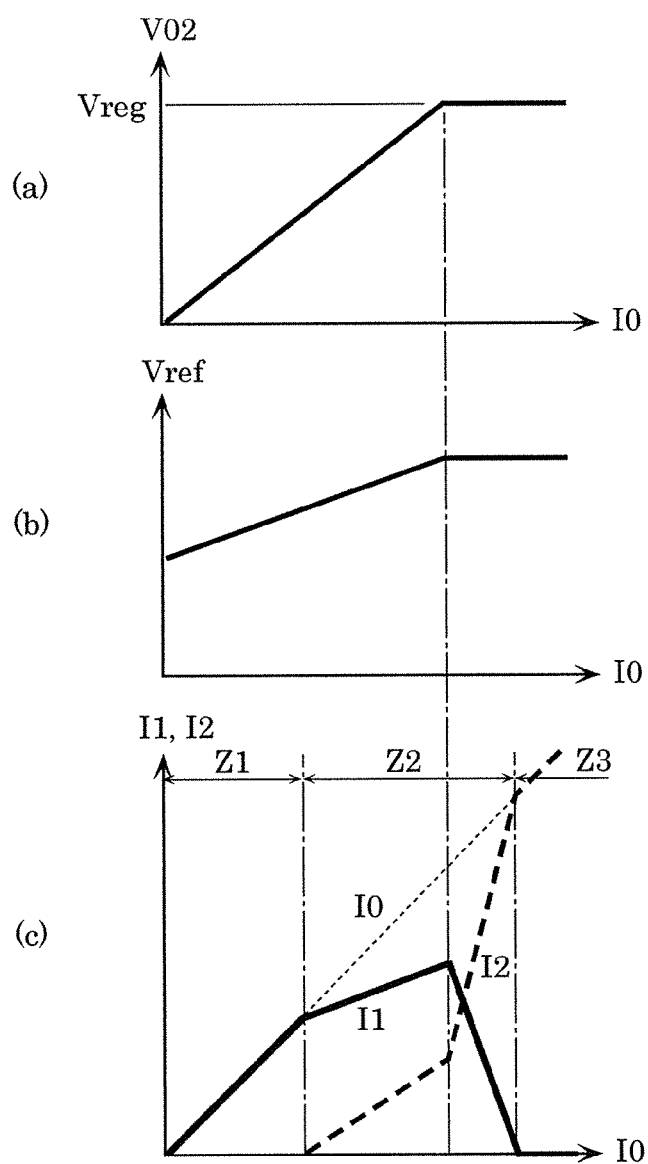
FIG. 24 is a graph illustrating an example of the relationship between currents flowing through a first light-emitting element column and a second light-emitting element column and a constant current according to Embodiment 6.

FIG. 24 is a graph illustrating an example of the relationship between the currents flowing through the first light-emitting element column and the second light-emitting element column and constant current I0 according to this embodiment. In FIG. 24, graph (a) illustrates the relationship between the output voltage op-amp OP2 and constant current I0, and graph (b) illustrates the relationship between reference voltage Vref and constant current I0. Graph (c) in FIG. 24 illustrates the relationship between the currents flowing through first light-emitting element column LEDG1 and second light-emitting element column LEDG2 and constant current I0.

In the graph for light-emitting apparatus 1A according to Embodiment 1 illustrated in FIG. 3, current I1 monotonically decreases and current I2 monotonically increases in range Z2.

In contrast, in the graph of light-emitting apparatus 1E in this embodiment illustrated in FIG. 24, current I1 increases in the initial half of range Z2 and decreases in the latter half. Accordingly, the rate of increase of current I2 is higher in the latter half of range Z2 than in the initial half.

In other words, when the magnitude of constant current I0 is greater than or equal to a third threshold value which is greater than or equal to the first threshold value (i.e., the whole of range Z2 in Embodiment 2, and the latter half portion of range Z2 in this embodiment), current adjuster circuit 10E adjusts the magnitude of the current flowing through first light-emitting element column LEDG1 so that the magnitude of the current flowing through first light-emitting element column LEDG1 decreases as constant current I0 increases.

In addition, in this embodiment, the relationship between the dimming level and the current flowing through each of the light-emitting element columns can be adjusted by adjusting variable resistor Ri in the same manner as in Embodiment 1. It should be noted that, in order to further improve adjustment flexibility, a variable resistor may be used in place of resistor Ri5. Accordingly, it is possible to adjust the dimming level at the changing point corresponding to the third threshold value.

[6-3. Advantageous Effect, etc.]

In this embodiment, reference voltage Vref is changed according to constant current I0, and thus allowing variations to the dimming pattern. Accordingly, it is possible to further improve the flexibility of the correspondence relationship between the dimming and color toning of light-emitting apparatus 1E.

In addition, this embodiment also produces the same advantageous effects as Embodiment 1.

Embodiment 7

Next, as Embodiment 7, applications of the luminaire according to each of the embodiments described above will be described using the references.

Figure 25:
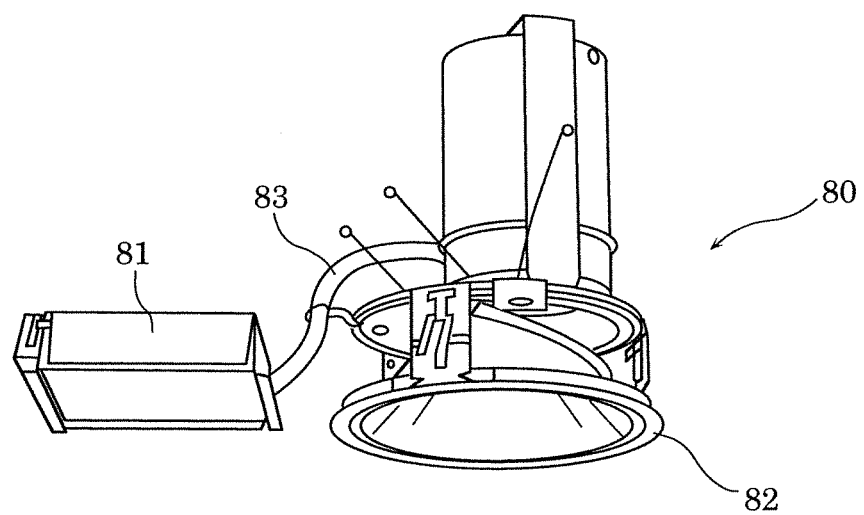
FIG. 25 is a perspective view illustrating an example of the external appearance of a luminaire according to Embodiment 7.

FIG. 25 is a perspective view illustrating an example of the external appearance of luminaire 80 according to this embodiment. Luminaire 80 illustrated in FIG. 25 is a downlight, and includes circuit box 81, lamp body 82, and wire 83. Circuit box 81 houses circuits included in luminaire 80 such as, for example, dimming LED driver 30 and light-emitting apparatus 1A. Lamp body 82 houses light source unit 20A. Wire 83 is a wire that connects the circuits and the light source unit included in luminaire 80. It should be noted that circuits such as light-emitting apparatus 1A included in luminaire 80 may be mounted on the same base as light source unit 20A, and housed in lamp body 82.

It should be noted that applications of the luminaire according to each of the embodiments described above are not limited to a downlight. The luminaire according to each of the embodiments described above can be applied to an arbitrary luminaire that performs dimming and color toning.

Others

Although light-emitting apparatuses and luminaires according to this disclosure have been described based on each of the foregoing embodiments, the present disclosure is not limited to the foregoing embodiments.

(1) For example, although the case where the first light-emitting elements and the second light-emitting elements are LEDs is exemplified in each of the foregoing embodiments, the present disclosure is not limited to such a configuration.

The first light-emitting elements and the second light-emitting elements may be configured of other light-emitting elements such as organic electroluminescence (EL) elements, etc.

(2) Furthermore, although there are two light-emitting element columns in each of the foregoing embodiments, as long as there is a plurality of the light-emitting element columns, there may be three or more.

(3) Although each of the foregoing embodiments exemplifies the case where the magnitude of the forward voltage is the same (the same type) for all the LEDs which are examples of the first light-emitting elements and the second light-emitting elements, the present disclosure is not limited to such a configuration. The following relationship may be satisfied: the sum of the forward voltages of first light-emitting element column LEDG1<the sum of the forward voltages of light-emitting element column in the last stage. The light-emitting element column in the last stage is the light-emitting element column to which a current adjuster circuit is not provided, and is second light-emitting element column LEDG2 in each of the forgoing embodiments.

(4) Although the case in which the light-emitting apparatus includes a plurality of light-emitting element columns with both color temperature and light distribution characteristics being different is described in each of the foregoing embodiments, the configuration of the light-emitting apparatus is not limited to such. The light-emitting apparatus may be of another configuration such as one which includes a plurality of light-emitting element columns between which, for example, only the color temperature or only the light distribution characteristics is different.

(5) Although the number of LEDs included in first light-emitting element column LEDG1 is set to 4 and the number of LEDs included in second light-emitting element column LEDG2 is set to 5 in each of the foregoing embodiments, the present disclosure is not limited to such a configuration.

It should be noted that, in each of the foregoing embodiments, due to the difference in the sums of the forward voltages, the timing for starting light-emission for second light-emitting element column LEDG2 is staggered with respect to first light-emitting element column LEDG1, and thus the number of LEDs in second light-emitting element column LEDG2 may be greater than the number of LEDs in first light-emitting element column LEDG1. Furthermore, in the case where three or more light-emitting element columns are included, the number of LEDs may be determined in such a way as to provide a difference among the sums of the forward voltages of the respective light-emitting element columns.

(6) Although a constant current detector circuit is provided in each of the foregoing embodiments, the constant current detector circuit is not an essential structural component.

Figure 26:
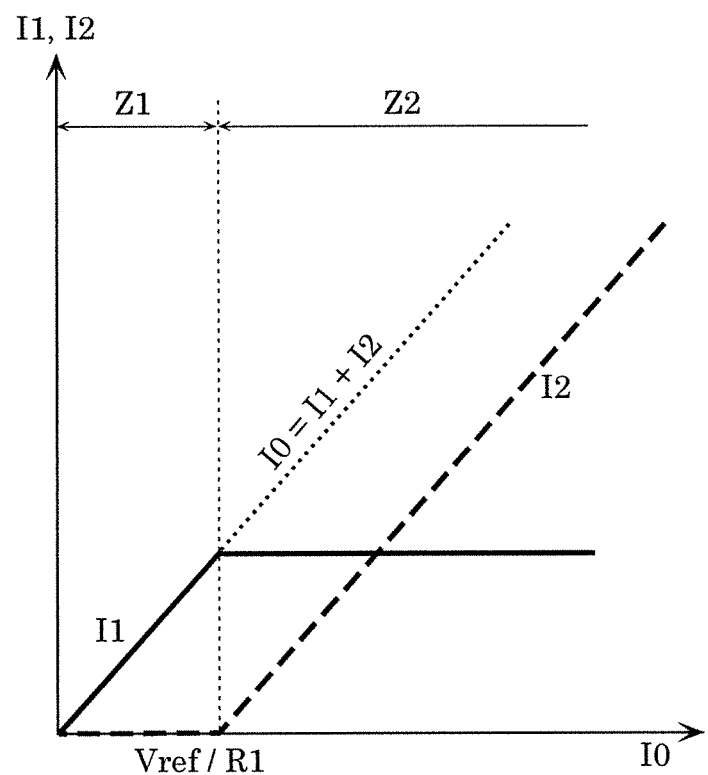
FIG. 26 is a graph illustrating an example of the relationship between the first light-emitting element column and the second light-emitting element column and the constant current in the case where a constant current detector circuit is not provided in the light-emitting apparatus according to Embodiment 1.

FIG. 26 is a graph illustrating an example of the relationship (dimming pattern) between a first light-emitting element column and a second light-emitting element column and constant current I0 in the case where a constant current detector circuit is not provided (Modification 1 of Embodiment 1).

In this case, current I1 flowing through first light-emitting element column LEDG1 does not become 0 (i.e., range Z3 cannot be provided).

(7) Aside from the above, forms obtained by various modifications to the respective exemplary embodiments that can be conceived by a person of skill in the art as well as forms realized by arbitrarily combining structural components and functions in the respective exemplary embodiments which are within the scope of the essence of the present disclosure are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light-emitting apparatus to which a constant current corresponding to a dimming level is supplied from a constant current supply, the light-emitting apparatus comprising:
    a light source unit to which the constant current is supplied, and which includes:
        a first light-emitting element column including one of a single first light-emitting element or a plurality of first light-emitting elements connected in series; and
        a second light-emitting element column connected in parallel with the first light-emitting element column, and including one of a single second light-emitting element or a plurality of second light-emitting elements connected in series;
    a first detector circuit which is connected in series to the first light-emitting element column, and detects a magnitude of a current flowing through the first light-emitting element column;
    a current adjuster circuit which adjusts a relationship of the magnitude of the current flowing through the first light-emitting element column to the constant current, based on the magnitude of the current detected by the first detector circuit; and
    a relationship adjuster circuit which adjusts the dimming level at a changing point at which a relationship of the magnitude of the current flowing through the first light-emitting element column to the dimming level changes as a result of adjustment by the current adjuster circuit.

2. The light-emitting apparatus according to claim 1, wherein the changing point is a point at which a rate of change in the magnitude of the current flowing through the first light-emitting element column with respect to the dimming level changes.

3. The light-emitting apparatus according to claim 1, wherein a color of light emitted by the first light-emitting element column is different from a color of light emitted by the second light-emitting element column.

4. The light-emitting apparatus according to claim 1, wherein a sum of forward voltages of the one of the single second light-emitting element or the plurality of second light-emitting elements included in the second light-emitting element column is greater than a sum of forward voltages of the one of the single first light-emitting element or the plurality of first light-emitting elements included in the first light-emitting element column.

5. The light-emitting apparatus according to claim 1, wherein the current adjuster circuit compares the magnitude of the current detected by the first detector circuit to a reference value, and adjusts the magnitude of the current flowing through the first light-emitting element column to the dimming level, based on a result of the comparison.

6. The light-emitting apparatus according to claim 5,
wherein the first detector circuit is a resistor connected in series to the first light-emitting element column, and
the current adjuster circuit includes:
- a transistor which adjusts the current flowing through the first light-emitting element column; and
- a comparator amplifier circuit which compares a voltage drop in the first detector circuit to the reference value, and applies a voltage which is in accordance with a result of the comparison by the comparator amplifier circuit, to a control terminal of the transistor.

7. The light-emitting apparatus according to claim 5,
wherein the relationship adjuster circuit adjusts the dimming level at the changing point by adjusting the reference value.

8. The light-emitting apparatus according to claim 7,
wherein the relationship adjuster circuit is a variable resistor which adjusts the reference value.

9. The light-emitting apparatus according to claim 6,
wherein the relationship adjuster circuit is a variable resistor connected in series to the light source unit.

10. The light-emitting apparatus according to claim 1,
wherein the relationship adjuster circuit adjusts the dimming level at the changing point, based on a magnitude of the constant current corresponding to the dimming level that has a predetermined value.

11. The light-emitting apparatus according to claim 10,
wherein the relationship adjuster circuit includes a storage which stores a value corresponding to the magnitude of the constant current corresponding to the dimming level that has the predetermined value.

12. The light-emitting apparatus according to claim 1, further comprising
a second detector circuit which detects a magnitude of a current flowing through the second light-emitting element column.

13. The light-emitting apparatus according to claim 1,
wherein the first light-emitting element column, the second light-emitting element column, the first detector circuit, the current adjuster circuit, and the relationship adjuster circuit are mounted on a same base.

14. A luminaire comprising:
the light-emitting apparatus according to claim 1; and
the constant current supply.

15. The luminaire according to claim 14,
wherein the constant current supply is a dimming LED driver which supplies alternating current power via a phase dimmer.

16. A method of adjusting a light-emitting apparatus including:
a light source unit to which a constant current corresponding to a dimming level is supplied, and which includes:
a first light-emitting element column including one of a single first light-emitting element or a plurality of first light-emitting elements connected in series; and
a second light-emitting element column connected in parallel with the first light-emitting element column, and including one of a single second light-emitting element or a plurality of second light-emitting elements connected in series;
a first detector circuit which is connected in series to the first light-emitting element column, and detects a magnitude of a current flowing through the first light-emitting element column; and
a current adjuster circuit which adjusts a relationship of the magnitude of the current flowing through the first light-emitting element column to the constant current, based on the magnitude of the current detected by the first detector circuit,
the method comprising
adjusting the dimming level at a changing point at which a relationship of the magnitude of the current flowing through the first light-emitting element column to the dimming level changes as a result of adjustment by the current adjuster circuit.

17. The method of adjusting a light-emitting apparatus according to claim 16,
wherein in the adjusting, the dimming level at the changing point is adjusted based on a magnitude of the constant current corresponding to the dimming level that has a predetermined value.

18. The method of adjusting a light-emitting apparatus according to claim 16, further comprising:
connecting a second detector circuit in series to the second light-emitting element column, the second detector circuit detecting a magnitude of a current flowing through the second light-emitting element column; and
supplying the constant current when the dimming level is the predetermined value, to the light source unit,
wherein in the adjusting, the dimming level at the changing point is adjusted based on the magnitude of the current detected by the first detector circuit and the magnitude of the current detected by the second detector circuit.

19. The method of adjusting a light-emitting apparatus according to claim 18,
wherein the first detector circuit is a first resistor,
the second detector circuit is a second resistor, and
in the adjusting, the dimming level at the changing point is adjusted so that a potential difference between one end of the first detector circuit and one end of the second detector circuit is at most a predetermined value.

* * * * *